United States Patent
Yoshitani

(10) Patent No.: US 6,850,599 B2
(45) Date of Patent: Feb. 1, 2005

(54) COMMUNICATION SYSTEM AND COMMUNICATION CONTROL APPARATUS

(75) Inventor: Norifumi Yoshitani, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 137 days.

(21) Appl. No.: 10/383,110

(22) Filed: Mar. 7, 2003

(65) Prior Publication Data

US 2003/0169854 A1 Sep. 11, 2003

(30) Foreign Application Priority Data

Mar. 8, 2002 (JP) ........................................ 2002-064470

(51) Int. Cl.[7] ........................ H04M 11/04; H04M 11/00
(52) U.S. Cl. ..................................... 379/37; 379/90.01
(58) Field of Search ......................... 379/37–51, 90.01, 379/93.02, 93.05–93.08, 900

(56) References Cited

U.S. PATENT DOCUMENTS

| | | | | |
|---|---|---|---|---|
| 5,724,411 A | * | 3/1998 | Eisdorfer et al. | 379/93.23 |
| 5,799,062 A | * | 8/1998 | Lazzara et al. | 379/51 |
| 6,069,899 A | * | 5/2000 | Foley | 379/90.01 |
| 6,370,233 B1 | * | 4/2002 | Bennett et al. | 379/37 |
| 6,594,350 B2 | * | 7/2003 | Tang | 379/93.34 |
| 6,744,856 B2 | * | 6/2004 | Karnik et al. | 379/45 |
| 6,754,315 B1 | * | 6/2004 | Miura et al. | 379/93.07 |

FOREIGN PATENT DOCUMENTS

| | | |
|---|---|---|
| JP | 63-45995 A | 2/1988 |
| JP | 7-240774 A | 9/1995 |
| JP | 11-215238 A | 8/1999 |
| JP | 2000-184411 A | 6/2000 |

* cited by examiner

*Primary Examiner*—Wing F Chan
(74) *Attorney, Agent, or Firm*—Birch, Stewart, Kolasch & Birch, LLP

(57) ABSTRACT

When a telephone apparatus makes a particular and emergency call using a telephone communication line and another telephone apparatus is already performing communications using the telephone communication line, then the control apparatus controls refers to a particular/emergency number table stored in a storage device and disconnects the communications that are currently being performed to transmit signals for the particular and emergency call. The control apparatus disconnects the communications and also reconnects the disconnected communications using an Internet communication line by referring to a line use status table stored in the storage device. At the time of the disconnection, an announcement that the communications are to be disconnected is also made beforehand to the telephone apparatus the communications over which are to be disconnected.

21 Claims, 19 Drawing Sheets

FIG. 3A

| TABLE NUMBER | TELEPHONE NUMBER | NAME | SELECTABLE LINE | PRIORITY | PROCESS NUMBER |
|---|---|---|---|---|---|
| 001 | 110 | POLICE STATION | 1 | SET | #001 |
| 002 | 119 | FIRE STATION | 1 | SET | #001 |
| 003 | 0123-456-XXXX | MR. SATO | 1, 2, 3 | CLR | - |
| 005 | 090-XXXX-XXXX | MR. YAMADA | 1 | CLR | - |
| 007 | | | | | |
| 008 | | | | | |

FIG. 3B

| PROCESS NUMBER | PROCESS DETAIL ||
| | APPARATUS TO BE USED | PROCESS |
|---|---|---|
| #001 | ALL | TRANSFER EMERGENCY CALL OCCURRENCE NOTIFICATION PACKET |
| #002 | AIR CONDITIONER | TRANSFER SWITCH-ON PACKET |
| #003 | AIR CONDITIONER | TRANSFER SWITCH-OFF PACKET |
| #004 | | |
| | | |

FIG. 3C

| LINE NUMBER | LINE TYPE | LINE STATUS | TELEPHONE NUMBER OF COMMUNICATION PARTNER | NAME OF COMMUNICATION PARTNER | PRIORITY |
|---|---|---|---|---|---|
| LINE 1 | ANALOG LINE | TALK | 119 | FIRE STATION | SET |
| LINE 2 | CATV LINE 1 | FREE | - | - | - |
| LINE 3 | CATV LINE 2 | RINGING | 090-XXXX-XXXX | MR. YAMADA | CLR |
| LINE 4 | NOT SUPPORT | - | - | - | - |
| LINE 5 | NOT SUPPORT | - | - | - | - |

COMMUNICATION SYSTEM AND COMMUNICATION CONTROL APPARATUS

BACKGROUND OF THE INVENTION

1. Field of the Invention

The present invention relates to a communication system for communicating with an external telephone apparatus and the like using an analog or digital communication line, and a communication control apparatus preferably used for the communication system.

2. Description of the Related Art

Unlike the conventional analog telephone technology, the network telephone technology for communications performed by sending/receiving speech packets via a network such as the Internet is advantageous, for example, in that long distance communications can be performed at a low rate or a fixed charge, and therefore is expected to be commonly used and developed from now on. For example, charges for communications over network telephones are constituted only by calling fees and access fees to an access point provided by a provider as in the case of the conventional Internet connection, so that communications can be performed at low rates, irrespective of the distance from a person to be communicated with.

However, the network telephone technology is still under development, and is incapable of providing all services that have been established in the conventional analog telephone technology. In particular, for an emergency call to police stations or for an ambulance, the location of a caller should be identified on the receiving side, and therefore the network telephone, which is incapable of identifying the location of a caller, cannot be used for emergency calls. Therefore, when using the network telephone, it is necessary to establish a configuration in which both the network telephone technology and the analog telephone technology can be used.

In order to connect to a plurality of communication lines (e.g., the Internet and telephone lines) simultaneously for the purpose of using both the network telephone technology and the analog telephone technology, it is necessary to control communications between a plurality of telephone apparatuses and a plurality of communication lines by introducing a communication control apparatus such as a gateway apparatus. Furthermore, the following techniques are published: a technique in which a gateway apparatus detects a particular operation (e.g., determination by a dial number or a dedicated button) input from a telephone apparatus and selects an appropriate communication line to perform communications when utilizing a service available only via a particular communication line; and a technique of disconnecting a communication line that is being used by another telephone apparatus to have the line available for an emergency call when making the emergency call through a telephone apparatus.

The switchboard disclosed in Japanese Unexamined Patent Publication JP-A 2000-184411 (2000) selects a particular network from a plurality of connectable networks including the Internet based on a dialed number or an operation. Thus, the networks to be connected can be switched by a simple operation.

In the public base station of a communication system disclosed in Japanese Unexamined Patent Publication JP-A 11-215238 (1999), when a line is busy, a particular number is called so that a portable terminal using the line for communications performs an urging operation for urging the user to finish the communications. The public base station, which has received a signal indicating the end of the call from the portable terminal, disconnects the communications and establishes communications for the portable terminal that called the particular number. Thus, the busy state can be eliminated in a short time.

The key telephone apparatus disclosed in Japanese Unexamined Patent Publication JP-A 63-45995 (1988) disconnects communications through key telephone terminals, upon an input of an emergency contact command by control means, and performs paging to all of the terminals from the terminal that has transmitted the emergency contact command. Thus, it is possible to perform the paging to all of the terminals at the same time.

The telephone apparatus disclosed in Japanese Unexamined Patent Publication JP-A 7-240774 (1995) includes a parent apparatus having an emergency notification button and a cordless child apparatus. When the emergency notification button is pressed while the child apparatus is communicating, then a rumbling tone signal is transmitted from the host apparatus to the slave apparatus. This makes it possible that the slave apparatus can stop the communications immediately.

In addition, there is a standard referred to as HomePNA (Home Phoneline Networking Alliance). With this standard, both analog telephone signals and digital data signals can be transferred via an indoor telephone wire, so that communications over the conventional analog telephone and the network telephone can be performed with a single interface, and also apparatuses for this standard are on sale.

When making an emergency call to a police station or a fire station (for fire-fighting or an ambulance), using a telephone apparatus that detects an dialed number or an operation and selects an appropriate communication line from a plurality of connectable communication lines including the Internet communication line for communications such as the switchboard disclosed in JP-A 2000-184411, a gateway apparatus selects an analog telephone line from a plurality of communication lines based on an inputted telephone number to transmit signals for an emergency call. If the analog telephone line is in use by another telephone apparatus, then a process for disconnecting the communications over that telephone apparatus to make the analog telephone line available can be performed.

However, a user who was engaged in communications previously with the analog telephone line does not know the cause of the disconnection and has to perform an operation for calling back. Moreover, when the analog line is in use when calling back, then operations, for example, for searching an open line or using a digital line are also required. Furthermore, the user on the emergency call transmission side can know the cause for the disconnection easily because this user is relatively near the user who has transmitted signals for the emergency call. However, it is difficult for the other user who has been interrupted during his/her call to know the cause for the disconnection. Thus, the communication control process by the conventional gateway apparatus imposes a heavy burden on users after the disconnection of the communications and is significantly user-unfriendly.

SUMMARY OF THE INVENTION

It is an object of the invention to provide a communication system and a communication control apparatus that can alleviate a burden on a user who was communicating by reducing the number of operations and improve the convenience for all the users using the telephone apparatuses, even if communications over a telephone apparatus are disconnected by transmission for particular communications such as an emergency call.

The invention provides a communication system comprising a communication control apparatus connected to a plurality of types of communication lines with different communication methods and a plurality of communication terminal apparatuses that are connected to the communication control apparatus and perform communications with external communication terminal apparatuses via the plurality of types of communication lines, wherein the communication control apparatus includes identification information storage means for storing identification information for identifying a communication terminal apparatus of another party that is communicating with the communication terminal apparatus; control means for performing control such that when the communication terminal apparatus is about to start particular communications using a communication line of a particular type and another communication terminal apparatus is already performing communications using the communication line of the particular type, then the communications that are currently being performed are disconnected and the particular communications are started; and reconnection means for, when the communications are disconnected by the control means, reconnecting the disconnected communications using another communication line that is not being used for communication, based on the identification information stored in the storage means.

According to the invention, a plurality of communication terminal apparatuses are connected to a communication control apparatus to which a plurality of types of communication lines with different communication methods are connected, and perform communications with external communication terminal apparatuses via the plurality of types of communication lines. The communication control apparatus stores identification information for identifying a communication terminal apparatus of the other party that is communicating with the communication terminal apparatus in identification information storage means.

When the communication terminal apparatus is about to start particular communications using a communication line of a particular type and another communication terminal apparatus is already performing communications using the communication line of the particular type, then the control means of the communication control apparatus performs control such that the communications that are currently being performed are disconnected and the particular communications are started. When the communications are disconnected by the communication control means, reconnection means of the communication control apparatus reconnects the disconnected communications using another communication line that is not being used for communication, based on the identification information stored in the identification storage means. Thus, a user who was communicating previously using the communication line of the particular type does not have to perform an operation for reconnecting when the communications are disconnected, so that it is possible to alleviate a burden on the user by reducing the number of operations of the user.

In the invention it is preferable that the communication control apparatus includes disconnection notification means for transmitting disconnection notification information indicating that the communications will be disconnected to the communication terminal apparatus that is performing the communications to be disconnected, when the communications that are currently being performed are disconnected by the control means, and the communication terminal apparatus includes disconnection informing means for receiving the disconnection notification information from the disconnection notification means and informing the user of the contents of the disconnection notification information.

According to the invention, when the communications that are currently being performed are disconnected by the control means, the disconnection notification means of the communication control apparatus transmits in advance the disconnection notification information indicating that the communications will be disconnected to the communication terminal apparatus that is performing the communications to be disconnected. The disconnection informing means of the communication terminal apparatus receives the disconnection notification information from the disconnection notification means and informs the user of the contents of the disconnection notification information. Thus, the user who has been communicating using the communication line of the particular type can know, for example, that the communications will be disconnected and why the disconnection will be caused, and the convenience for the user using the communication terminal apparatus can be improved.

In the invention it is preferable that the disconnection notification means transmits the disconnection notification information in the form of speech signals using the communication line.

According to the invention, the disconnection notification means transmits the disconnection notification information in the form of speech signals using the communication line. Thus, the disconnection notification information can be transmitted also to the external communication terminal apparatus that is communicating with the communication terminal apparatus within the communication system, and the convenience for the user using the external communication terminal apparatus can be improved.

In the invention it is preferable that the communication control apparatus includes particular notification means for transmitting particular notification information indicating that the particular communications will be performed to the other communication terminal apparatuses connected thereto when the communications that are currently being performed are disconnected by the control means, and the communication terminal apparatus includes particular informing means for receiving the particular notification information from the particular information means and informing the user of the contents of the particular notification information.

According to the invention, when the communications that are currently being performed are disconnected by the control means, the particular notification means of the communication control apparatus transmits particular notification information indicating that the particular communications will be performed to the other communication terminal apparatuses connected thereto. The particular informing means of the communication terminal apparatus receives the particular notification information from the particular notification means and informs the user of the contents of the particular notification information. Thus, the users of the other communication terminal apparatuses connected can know, for example, that the particular communications are being performed and which is the communication terminal apparatus that is performing the particular communications, and the convenience for the users using the communication terminal apparatuses can be improved.

In the invention it is preferable that the communication control apparatus includes predetermined operation storage means for storing an operation table in which a predetermined operation of the communication terminal apparatus, the communication control apparatus performing the predetermined operation and an operation number assigned to each predetermined operation are associated with each other, and the communication terminal apparatus includes predetermined information notification means for notifying the control means of a predetermined information related to the operation number, wherein when receiving the predetermined information notified from the predetermined information notification means, the control means refers to the operation table and instructs the communication terminal apparatus corresponding to the operation number to perform the predetermined operation.

According to the invention, the predetermined operation storage means of the communication control apparatus stores an operation table in which a predetermined operation of the communication terminal apparatus and an operation number assigned to each predetermined operation are associated with each other. When the predetermined information notification means of the communication terminal apparatus notifies the control means of the predetermined information related to the operation number and the control means of the communication control apparatus receives the predetermined information notified from the predetermined information notification means, the control means refers to the operation table and instructs the communication terminal apparatus corresponding to the operation number to perform the predetermined operation. Thus, if, as the communication terminal apparatuses, for example, a plurality of network cameras are connected to the communication system and the predetermined operation of taking a picture is registered in the operation table, then, for example, in the case where the particular communications occur, the situation can be confirmed as an image by operating the network camera from the communication terminal apparatus and taking a picture.

In another aspect, the invention provides a communication control apparatus constituting a communication system including the communication control apparatus connected to a plurality of types of communication lines with different communication methods and a plurality of communication terminal apparatuses that are connected to the communication control apparatus and perform communications with external communication terminal apparatuses via the plurality of types of communication lines, the communication control apparatus comprising identification information storage means for storing identification information for identifying a communication terminal apparatus of another party that is communicating with the communication terminal apparatus; control means for performing control such that when the communication terminal apparatus is about to start particular communications using a communication line of a particular type and another communication terminal apparatus is already performing communications using the communication line of the particular type, then the communications that are currently being performed are disconnected and the particular communications are started; and reconnection means for, when the communications are disconnected by the control means, reconnecting the disconnected communications using another communication line that is not being used for communication, based on the identification information stored in the storage means.

According to the invention, a plurality of communication terminal apparatuses are connected to a communication control apparatus to which a plurality of types of communication lines with different communication methods are connected, and perform communications with external communication terminal apparatuses via the plurality of types of communication lines. The communication control apparatus stores identification information for identifying a communication terminal apparatus of the other party that is communicating with the communication terminal apparatus in identification information storage means.

When the communication terminal apparatus is about to start particular communications using a communication line of a particular type and another communication terminal apparatus is already performing communications using the communication line of the particular type, then the control means of the communication control apparatus performs control such that the communications that are currently being performed are disconnected and the particular communications are started. When the communications are disconnected by the communication control means, reconnection means of the communication control apparatus reconnects the disconnected communications using another communication line that is not being used for communication, based on the identification information stored in the identification storage means. Thus, a user who was communicating previously using the communication line of the particular type does not have to perform an operation for reconnection when the communications are disconnected, so that it is possible to alleviate a burden on the user by reducing the number of operations of the user.

In the invention it is preferable that the communication control apparatus comprises disconnection notification means for, when the communications that are currently being performed are disconnected by the control means, transmitting disconnection notification information indicating that the communications will be disconnected to the communication terminal apparatus that is performing the communications to be disconnected.

According to the invention, when the communications that are currently being performed are disconnected by the control means, the disconnection notification means of the communication control apparatus transmits in advance the disconnection notification information indicating that the communications will be disconnected to the communication terminal apparatus that is performing the communications to be disconnected. Thus, it is possible to let the user who has been communicating using the communication line of the particular type know, for example, that the communications will be disconnected and why the disconnection will be caused, and the convenience for the user using the communication terminal apparatus can be improved.

In the invention it is preferable that the disconnection notification means transmits the disconnection notification information in the form of speech signals using the communication line.

According to the invention, the disconnection notification means transmits the disconnection notification information in the form of speech signals using the communication line. Thus, the disconnection notification information can be transmitted also to the external communication terminal apparatus that is communicating with the communication terminal apparatus within the communication system, and the convenience for the user using the external communication terminal apparatus can be improved.

In the invention it is preferable that the communication control apparatus comprises particular notification means for, when the communications that are currently being performed are disconnected by the control means, transmitting particular notification information indicating that the particular communications will be performed to the other communication terminal apparatuses connected thereto.

According to the invention, when the communications that are currently being performed are disconnected by the control means, the particular notification means of the communication control apparatus transmits the particular notification information indicating that the particular communications will be performed to the other connected communication terminal apparatuses. Thus, it is possible to let the users of the other communication terminal apparatuses connected know that the particular communications are being performed and which is the communication terminal apparatus that is performing the particular communications, for example, and the convenience for the users using the communication terminal apparatuses can be improved.

In still another aspect, the invention provides a communication system comprising a communication control apparatus connected to a communication line that can perform communications simultaneously using a plurality of types of communication methods and a plurality of communication terminal apparatuses that are connected to the communication control apparatus and perform communications with external communication terminal apparatuses via the communication line, wherein the communication control apparatus includes identification information storage means for storing identification information for identifying a communication terminal apparatus of the other party that is communicating with the communication terminal apparatus; control means for performing control such that when the communication terminal apparatus is about to start particular communications using a particular communication method and another communication terminal apparatus is already performing communications using the particular communication method, then the communications that are currently being performed are disconnected and the particular communications are started; and reconnection means for, when the communications are disconnected by the control means, reconnecting the disconnected communications using a communication method other than the particular communication method, based on the identification information stored in the storage means.

According to the invention, a plurality of communication terminal apparatuses are connected to a communication control apparatus connected to a communication line that can perform a communication using a particular communication method that is different from other communication methods, and perform communications with external communication terminal apparatuses via the communication line. The communication control apparatus stores identification information for identifying a communication terminal apparatus of the other party that is communicating with the communication terminal apparatus in identification information storage means.

When the communication terminal apparatus is about to start particular communications using the particular communication method and another communication terminal apparatus is already performing communications using the particular communication method, then the control means of the communication control apparatus performs control such that the communications that are currently being performed are disconnected and the particular communications are started. When the communications are disconnected by the communication control means, reconnection means of the communication control apparatus reconnects the disconnected communications using a communication method other than the particular communication method based on the identification information stored in the identification storage means. Thus, a user who was communicating previously using the particular communication method does not have to perform an operation for reconnecting, so that it is possible to alleviate a burden on the user by reducing the number of operations of the user.

In yet another aspect, the invention provides a communication system comprising a gateway apparatus connected to an analog communication line and a digital communication line and a plurality of telephone apparatuses that are connected to the gateway apparatus and perform communications with external telephone apparatuses via the analog and digital communication lines, wherein the gateway apparatus includes identification information storage means for storing identification information for identifying a telephone apparatus of the other party that is communicating with the telephone apparatus; communication control means for controlling such that when the telephone apparatus is about to start particular communications using the analog communication line and another telephone apparatus is already performing communications using the analog communication line, then the communications that are currently being performed are disconnected and the particular communications are started; and reconnection means for, when the communications are disconnected by the communication control means, reconnecting the disconnected communications using the digital communication line, based on the identification information stored in the storage means.

According to the invention, a plurality of telephone apparatuses are connected to a gateway apparatus connected to an analog communication line and a digital communication line, and perform communications with external telephone apparatuses via the analog communication line and the digital communication line. The gateway apparatus stores identification information for identifying a telephone apparatus of the other party that is communicating with the telephone apparatus in identification information storage means.

When the telephone apparatus is about to start particular communications using the analog communication line and another telephone apparatus is already performing communications using the analog communication line, then the control means of the gateway apparatus performs control such that the communications that are currently being performed are disconnected and the particular communications are started. When the communications are disconnected by the communication control means the reconnection means of the gateway apparatus reconnects the disconnected communications using the digital communication line based on the identification information stored in the identification storage means. Thus, a user who was communicating previously using the analog communication line does not have to perform an operation for reconnecting, so that it is possible to alleviate a burden on the user by reducing the number of operations of the user.

In the invention it is preferable that the gateway apparatus and one of the telephone apparatuses are integrated to form one unit.

According to the invention, the gateway apparatus and one of the telephone apparatuses are integrated to form one unit. Thus, even if the gateway apparatus cannot be used, for example, in the case of blackout, the telephone apparatus can perform speech communications using the analog communication line.

According to the invention, the user who was communicating previously using the communication line of the particular type does not have to perform the operation for reconnecting the communications when the communications are disconnected, and it is possible to alleviate a burden on the user by reducing the number of operations of the user.

Moreover, according to the invention, the user who has been communicating using the communication line of the particular type can know, for example, that the communications will be disconnected and why the disconnection will be caused, and the convenience for the user using the communication terminal apparatus can be improved.

Moreover, according to the invention, the users of the other communication terminal apparatuses connected to the communication control apparatus can know that the particular communications are being performed and which is the communication terminal apparatus that is performing the particular communications, so that the convenience for the users using the communication terminal apparatuses can be improved.

Furthermore, according to the invention, if, as the communication terminal apparatuses, for example, a plurality of network cameras are connected to the communication system and the predetermined operation of taking a picture is registered in the operation table, then, for example, in the case where the particular communications occur, the situation can be monitored as an image by operating the network camera from the communication terminal apparatus and taking a picture.

Moreover, according to the invention, the user who was communicating previously using the particular communication method does not have to perform the operation for reconnecting the communications when the communications are disconnected, so that it is possible to alleviate a burden on the user by reducing the number of operations of the user.

Moreover, according to the invention, the user who was communicating previously using the analog communication line does not have to perform the operation for reconnecting the communications when the communications are disconnected, so that it is possible to alleviate a burden on the user by reducing the number of operations of the user.

Furthermore, according to the invention, the gateway apparatus and one of the telephone apparatuses are integrated to form one unit. Thus, even if the gateway apparatus cannot be used, for example, in the case of blackout, the telephone apparatus can perform the speech communications using the analog communication line.

BRIEF DESCRIPTION OF THE DRAWINGS

Other and further objects, features, and advantages of the invention will be more explicit from the following detailed description taken with reference to the drawings wherein:

FIGS. 3A to 3C are diagrams showing various tables stored in a storage device;

DETAILED DESCRIPTION OF THE PREFERRED EMBODIMENTS

Now referring to the draw , preferred embodiments of the invention are described below.

Figure 1:
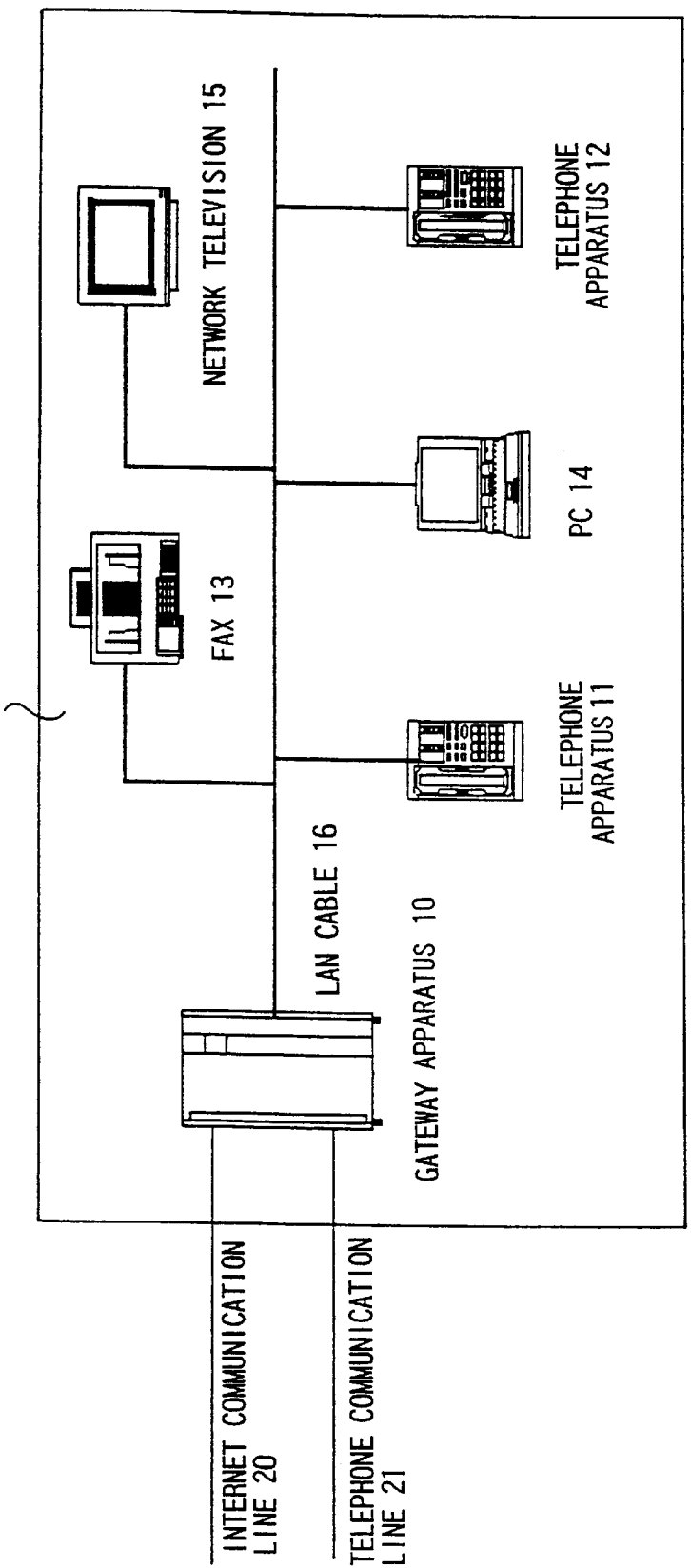
FIG. 1 is a diagram showing the configuration of a communication system including a gateway apparatus of an embodiment of the invention.

FIG. 1 is a diagram showing the configuration of a communication system 100 of an embodiment of the invention. The communication system 100 includes a gateway apparatus 10, which is a communication control apparatus, telephone apparatuses 11 and 12, a facsimile apparatus 13, a personal computer (PC) 14 and a network television 15, which are communication terminal apparatuses. These apparatuses are connected to each other via a LAN cable 16 such as an Ethernet cable. A plurality of types of communication lines with different communication methods such as an Internet communication line 20, which is a digital line, and a telephone communication line 21, which is an analog line, are connected to the gateway apparatus 10, so that each of the communication terminal apparatuses within the communication system 100 can communicate with external communication terminal apparatuses connected to the Internet communication line 20 and the telephone communication line 21. For the Internet communication line 20, a cable for a cable television (CATV), an optical fiber cable or the like can be used.

The telephone apparatuses 11 and 12 have the function of a network telephone like VoIP (Voice over Internet Protocol). The FACSIMILE apparatus 13, the PC 14 and the network television 15 have communication means under TCP/IP (Transmission Control Protocol/Internet Protocol).

The gateway apparatus 10 converts various types of data packets and analog telephone signals received via the Internet communication line 20 and the telephone communication line 21 into data packets that can be transferred over the LAN cable 16 and sends the data packets to each of the apparatuses within the communication system 100. Moreover, the gateway apparatus 10 transmits various types of data packets sent from each of the apparatuses via the LAN cable 16 by selecting an appropriate communication line and converting data packets into data of a type that can be transferred over the selected communication line.

When an dial operation is performed by a user with the telephone apparatus 11 or 12 for transmission, the dial information is sent in the form of data packets to the gateway apparatus 10. Based on the received dial information or telephone number data for particular communications and an emergency call that have been registered in the gateway apparatus 10 beforehand, the gateway apparatus 10 determines whether to carry out transmission for network telephone using the Internet communication line 20 or to carry out transmission for analog telephones using the telephone communication line 21 and then performs a call-starting process. With this call-starting process, a communication route between the telephone apparatus 11 or 12 and an external telephone apparatus is established. After the establishment of the communication route, the telephone apparatus 11 or 12 converts analog speech signals input from a microphone into digital speech data packets and sends the data packets to the gateway apparatus 10. The gateway apparatus 10 converts the digital speech data packets into a data format corresponding to the communication line and sends the data out to the Internet communication line 20 or the telephone communication line 21. Moreover, speech data packets received from the Internet communication line 20 or the telephone communication line 21 via the gateway apparatus 10 are converted into analog data and output from a speaker.

Figure 2:
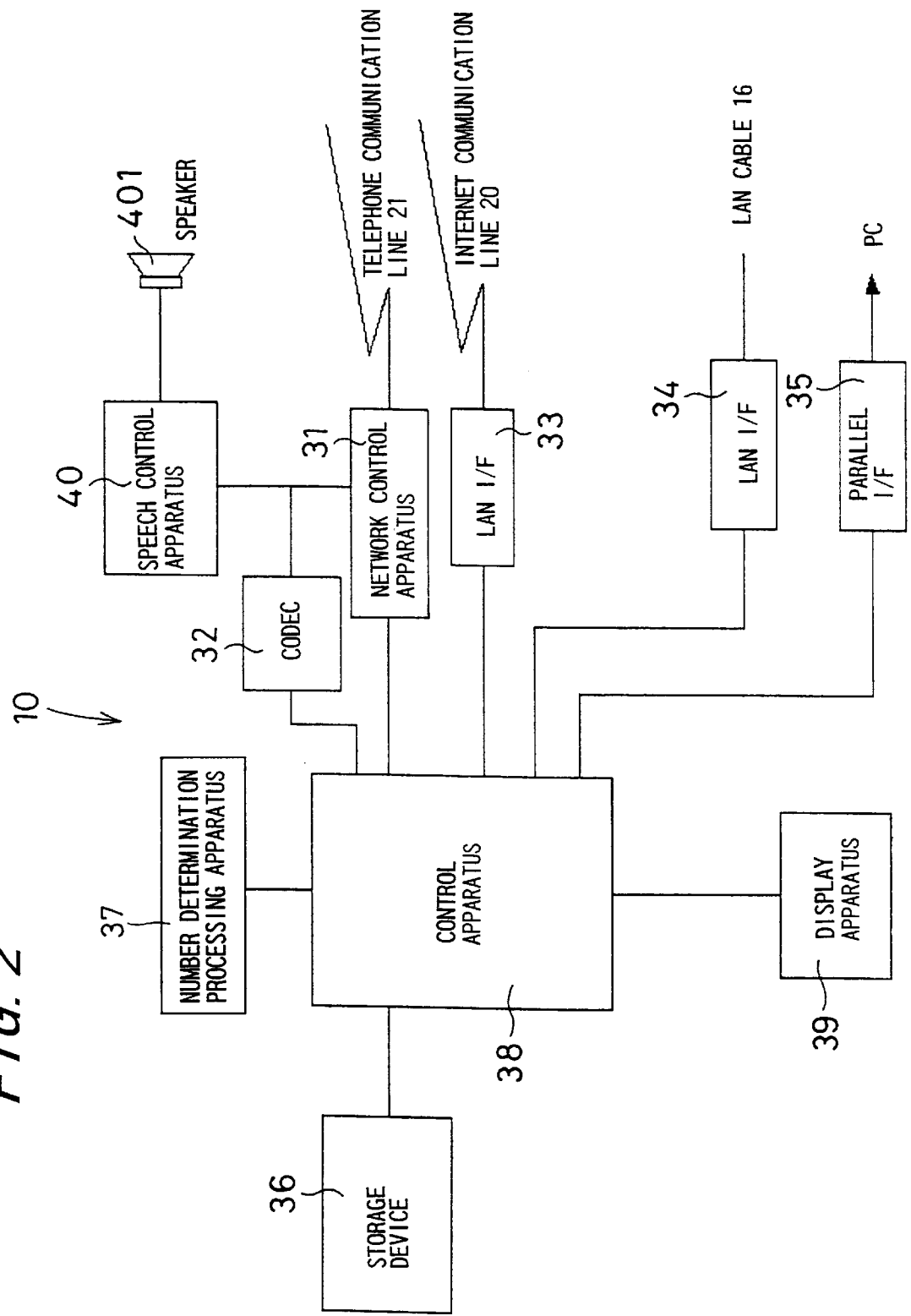
FIG. 2 is a block diagram showing the configuration of the gateway apparatus.

FIG. 2 is a block diagram showing the configuration of the gateway apparatus 10. The gateway apparatus 10 includes a network control apparatus 31, a CODEC 32, LAN I/Fs 33 and 34, a parallel I/F 35, a storage device 36, a number determination processing apparatus 37, a control apparatus 38, a display apparatus 39, a speech control apparatus 40 and a speaker 401.

The network control apparatus 31 is connected to the telephone communication line 21 and sends/receives analog speech signals to/from an external communication terminal apparatus (telephone apparatus). The CODEC 32 converses analog speech signals into speech data packets, and vice versa. The LAN I/F 33 is connected to the Internet communication line 20 and sends/receives data packets to/from an external communication terminal apparatus. Moreover, the LAN I/F 34 is connected to the LAN cable 16 and sends/receives the data packets to/from each of the communication terminal apparatuses within the communication system 100. The parallel I/F 35 is connected to a PC via a cable (not shown) and sends/receives data. The storage device 36 is identification information storage means for storing, for example, a telephone number or an IP address, which are identification information for identifying the other party of the communications when receiving or making a call. The storage device 36 also stores a particular/emergency number table including telephone numbers for particular communications such as the telephone numbers for emergency calls to a police station or a fire station.

FIG. 3A shows an example of the particular/emergency number table. In the particular/emergency number table, table numbers, telephone numbers, names, selectable lines, priorities and process numbers are registered. Regarding the selectable lines, numeral 1 denotes an analog telephone line, which is a telephone communication line, and numerals 2 and 3 denotes CATV lines, which are the Internet communication lines. Regarding the priorities, "SET" has a high priority. When establishing the communications denoted by SET, if the selectable lines are busy for communications, then current communications are disconnected and a connection for the communications denoted by SET is established. "CLR" has a low priority, and the communications denoted by "CLR" are performed using a selectable line, but do not have to be established by disconnecting the current communications. The process numbers correspond to the process numbers in a process table described below. The table numbers 001 and 002 are assigned a police station and a fire station as transmission destinations, respectively, and only the analog telephone line as the selectable line. Since "SET" is assigned as the priority, the communications for the table numbers 001 and 002 are established by priority, even if the analog telephone line is in use. It should be noted that the emergency call refers to telephone communications that require to specify a calling location and to call back to a caller, such as emergency calls to a police station or a fire station, and that require to use an analog telephone line.

When establishing communications, the number determination processing apparatus 37 determines whether or not the communications are directed to the particular/emergency number by referring to the particular/emergency number table stored in the storage device 36. The control apparatus 38 is control means and reconnection means that determines which should be used, analog telephone communications using the telephone communication line 21 or network telephone communications using the Internet communication line 20, based on the determination results of the number determination processing apparatus 37. The control apparatus 38 determines the operation of the entire apparatus and supplies commands to the entire apparatus in cooperation with a program stored in the storage device 36. The display apparatus 39 displays the state of the gateway apparatus 10, an error notification, and the like. The speech control apparatus 40 outputs analog speech signals that have been converted in the CODEC 32 from the speaker 401.

Hereinafter, the operation of the gateway apparatus 10 at the time of receiving/making a call will be described. First, the operation at the time of receiving signals is described. In the case of receiving signals from the telephone communication line 21, the network control apparatus 31 receives analog arriving signals, and the control apparatus 38 specifies a telephone apparatus that is to receive the signals from the arriving signals. Then, the control apparatus 38 generates data packets of the receiving information based on the arriving signals and transmits the data packets the arriving information to the telephone apparatus that is to receive, for example, the telephone apparatus 11, via the LAN I/F 34 and the LAN cable 16. At the same time, the control apparatus 38 lets the CODEC 32 acquire the telephone number information, which is the information for identifying the calling source, and stores the acquired information in the storage device 36. When analog speech signals are received, the CODEC 32 converts the analog speech signals into digital speech data. The control apparatus 38 packetizes the digital speech data into speech data packets and transmits the speech data packets to the telephone apparatus 11 via the LAN I/F 34 and the LAN cable 16.

In the case of receiving signals from the Internet communication line 20, the LAN I/F 33 receives data packets of digital arriving signals, and the control apparatus 38 specifies a telephone apparatus that is to receive from the arriving signals. Then, the control apparatus 38 generates data packets of the arriving information based on the arriving signals and transmits the data packets of the arriving information to the telephone apparatus that is to receive, for example the telephone apparatus 12, via the LAN I/F 34 and the LAN cable 16. At the same time, the control apparatus 38 receives dial data packets including the telephone number information, which is the information for identifying the transmission source, and stores the received telephone number information in the storage device 36. When digital speech data are received, the control apparatus 38 packetizes the digital speech data into speech data packets and transmits speech data packets to the telephone apparatus 12 via the LAN I/F 34 and the LAN cable 16.

Next, the operation at the time of making a call will be described. The LAN I/F 34 receives dial data packets including the telephone number information, which is the information for identifying the transmission destination, from the telephone apparatus 11 or 12 via the LAN cable 16. The control apparatus 38 lets the number determination processing apparatus 37 perform the number determination process. The number determination processing apparatus 37 determines whether or not the telephone number of the transmission destination is a particular or emergency number, referring to the particular/emergency number table registered in the storage device 36. The control apparatus 38 determines whether to perform the analog telephone communications using the telephone communication line 21 or the network telephone communications using the Internet communication line 20 based on the determination result.

When making a call using the Internet communication line 20, the control apparatus 38 outputs the dial data packets via the LAN I/F 33. When making a call, for example, to a particular destination for communications or an emergency call, using the telephone communication line 21, the control apparatus 38 supplies an instruction for calling to the network control apparatus 31 to let it perform a call-starting process. Then, when the LAN I/F 34 receives speech data packets via the LAN cable 16, the control apparatus 38 outputs the speech data packets to the Internet communication line 20 or the telephone communication line 21. In the case of outputting the speech data packets to the Internet communication line 20, the speech data packets are output to the Internet communication line 20 via the LAN I/F 33. In the case of outputting the speech data packets to the telephone communication line 21, the speech data packets are output to the CODEC 32 and converted into analog speech signals, and then the analog speech signals are output to the telephone communication line 21 via the network control apparatus 31.

The operations other than those for making and receiving a call are as follows. When the LAN I/F 34 receives control packets via the LAN cable 16, the control apparatus 38 determines the process content and outputs an instruction for operation to the storage device 36, the display apparatus 39, the speech control apparatus 40 or the like in accordance with the determination results. Moreover, since the gateway apparatus 10 often does not have an input apparatus such as a keyboard, for example, setting such as the operation settings or the connection settings of the gateway apparatus 10, and creation, correction or deletion of the particular/emergency number table stored in the storage device 36 are performed by, for example, a PC connected via the parallel I/F 35 or a PC 14 connected to the LAN cable 16.

Figure 4:
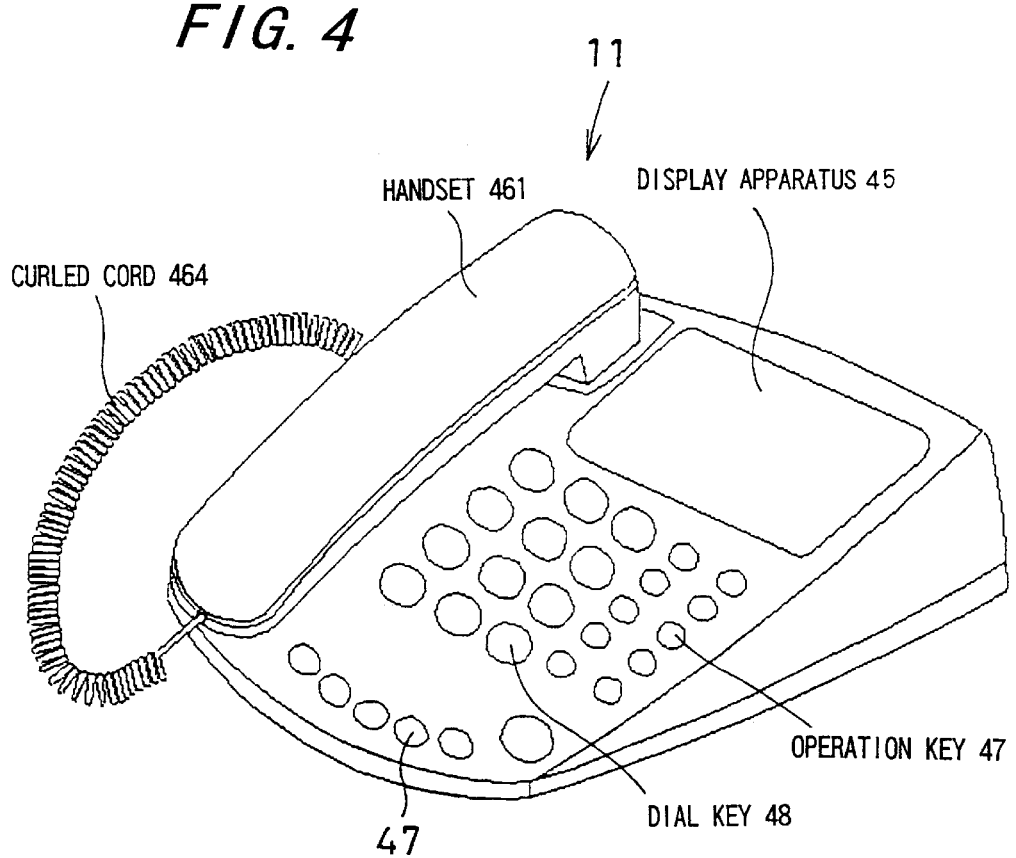
FIG. 4 is a perspective view of a telephone apparatus.
Figure 5:
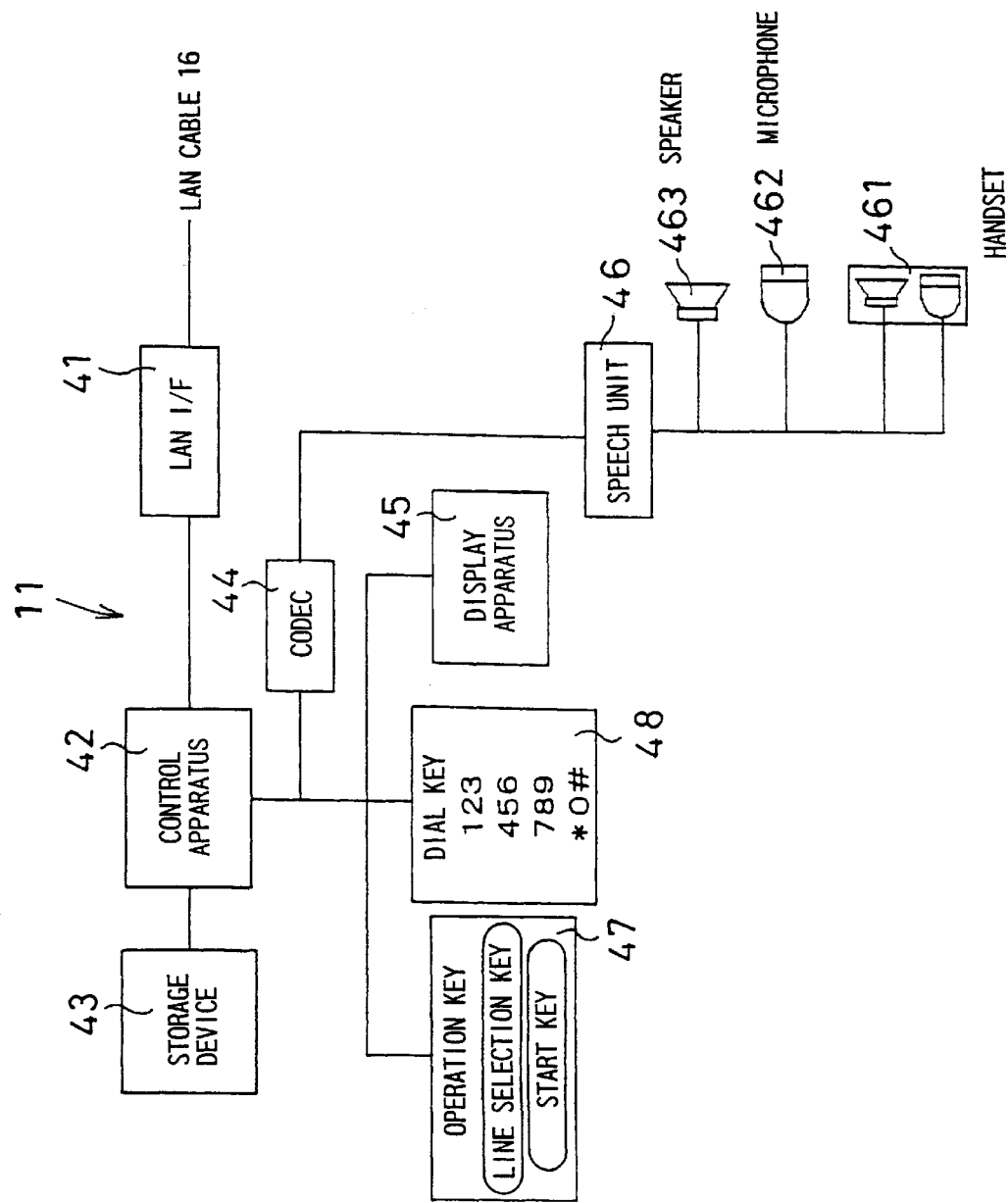
FIG. 5 is a block diagram showing the configuration of the telephone apparatus.

FIG. 4 is a perspective view of the telephone apparatus 11 and FIG. 5 is a block diagram showing the configuration of the telephone apparatus 11. The telephone apparatus 12 has the same configuration as that of the telephone apparatus 11. As shown in FIG. 4, a display apparatus 45, operation keys 47 and dial keys 48 are arranged on the top surface of the telephone apparatus 11, and a user operates the operation keys 47 and the dial keys 48 while referencing to the operation menu or the state of the apparatus that are displayed on the display apparatus 45. In addition, a handset 461 for speech communications is provided and connected to the main body of the apparatus by a curled cord 464.

As shown FIG. 5, the telephone apparatus 11 includes a LAN I/F 41, a control apparatus 42, a storage device 43, a CODEC 44, a display apparatus 45, a speech unit 46, the operation keys 47, the dial keys 48, the handset 461, a microphone 462 and a speaker 463. The LAN I/F 41 receives various types of data packets via the LAN cable 16. The control apparatus 42 outputs an instruction for operation to each of the apparatuses based on the received data packets. Here, the data packets includes control packets that have been predetermined to control the operation of the telephone apparatus 11, speech data packets, which are speech signals for speech communications, and dial data packets, which are the telephone number information of the destination to which a call is directed. The storage device 43 stores address book data including telephone numbers, names and addresses, history data on making /receiving calls, an answering message, a recorded message and the like. The CODEC 44 converses analog speech signals into speech data packets, and vice versa. The display apparatus 45 displays the state of the telephone apparatus 11, an error notification message, and the like. The speech unit 46 outputs the analog speech signals that have been converted in the CODEC 44 to the handset 461 or the speaker 463, and also outputs speech signals input from the handset 461 or the microphone 462 to the CODEC 44. The operation keys 47 and the dial keys 48 are used when the user uses the various functions of the telephone apparatus 11 or when the user makes telephone calls. The handset 461 is used when speech communications are performed and is provided with a microphone and a speaker. The microphone 462 and the speaker 463 serve to input an answering message or to reproduce and output a recorded message.

When the control packets are received from the gateway apparatus 10, the PC 14 or the like, for example, the control unit 42 outputs an instruction for operation to the speech unit 46 via the storage device 43, the CODEC 44 and the display apparatus 45. When the speech data packets are received via the LAN I/F 41, digital speech data in the speech data packets are sent to the CODEC 44. The CODEC 44 receives the digital speech data and converts the digital speech data into analog speech signals and sends them to the speech unit 46, and then the speech unit 46 outputs the received speech signals to the speaker 463 or the handset 461.

When making a call from the telephone apparatus 11, the dial keys 48 are operated by the user and the telephone number of a destination for speech communications is input. The telephone number information input with the dial keys 48 is recorded in the storage device 43. Then, when the operation keys 47 are operated and a communication start operation is performed, the control apparatus 42 converts the telephone number information recorded in the storage device 43 into dial data packets and transmits the dial data packets to the gateway apparatus 10. The analog speech signals input from the microphone 462 and the handset 461 are sent to the CODEC 44 via the speech unit 46. The CODEC 44 converts the speech signals into digital speech data and sends the digital speech data to the control apparatus 42. Then, the control apparatus 42 converts the received digital speech data into speech data packets and sends the speech data packets to the gateway apparatus 10.

FIGS. 6A to 6C and FIGS. 7A to 7C are conceptual diagrams for illustrating the switching of the communication states in the case where particular communications are performed from the telephone apparatus 12.

FIGS. 6A to 6C and FIGS. 7A to 7C show processes performed when an emergency call stored in the storage device 36 of the gateway apparatus 10 is made from the telephone apparatus 12 while the telephone apparatus 11 is busy for communications using the telephone communication line 21, which is an analog communication line. In this case, it is assumed that a plurality of Internet communication lines 20 and one analog telephone communication line are connected to the gateway apparatus 10.

Figure 6A:
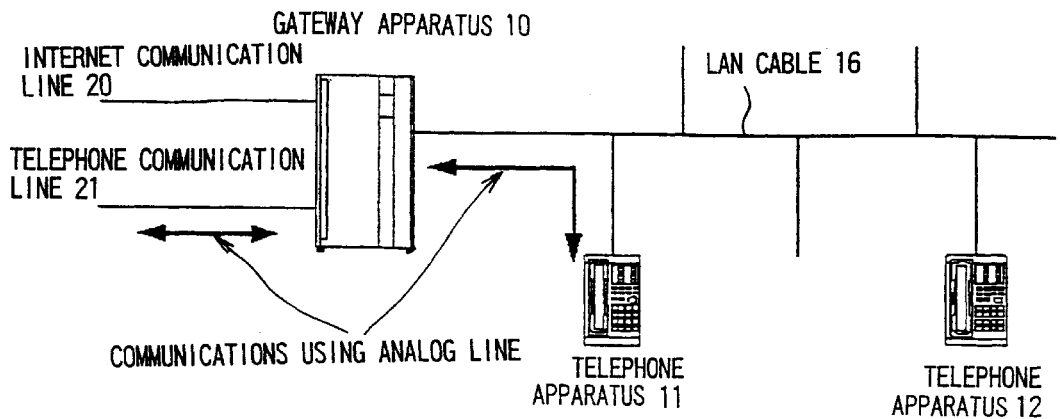
FIGS. 6A to 6C are conceptual diagrams for illustrating the switching of the communication state in the case where particular communications are performed from the telephone apparatus.

FIG. 6A shows that the telephone apparatus 11 is performing an analog telephone communication using the telephone communication line 21 that is a communication line of a particular type. In the storage device 36 of the gateway apparatus 10, for example, telephone number information on destinations to which the telephone apparatus 11 makes calls, the receiving history information such as caller IDs of received calls and an IP addresses of the telephone apparatuses used for communications are stored.

Figure 6B:
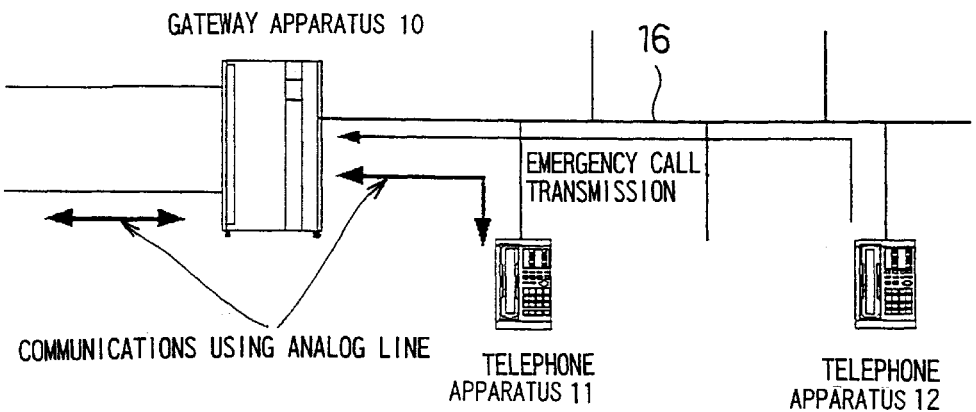
Figure 6C:
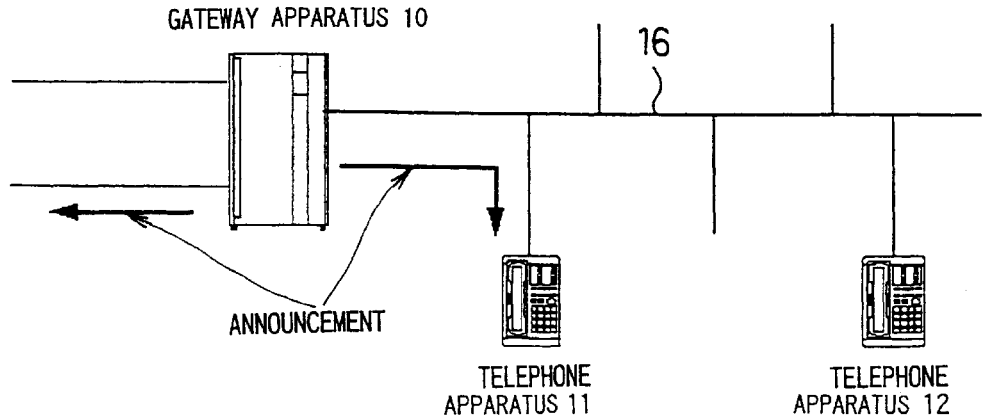

FIG. 6B shows that the telephone apparatus 12 is making an emergency call. The dial data packets including the telephone number information on the emergency call are transmitted from the telephone apparatus 12 to the gateway apparatus 10.

The gateway apparatus 10 receives the dial data packets. Since the telephone number included in the dial data packets matches a telephone number in the particular/emergency number table stored in the storage portion 36, the control apparatus 38, which is disconnection notification means, makes an announcement of information notifying disconnection to the telephone apparatus 11 and the telephone apparatus with which the telephone apparatus 11 is communicating, using the telephone communication line 21 (see FIG. 6C). The announcement can contain, for example, a notification that an emergency call has been made so that the current communications should be disconnected, and instructions as to what operations should be performed for the disconnection, and can be supplied in the form of the speech signals. Various settings with respect to, for example, whether or not voices should be muted between the telephone apparatus 11 and the telephone apparatus of the other party during the announcement or the contents of the instructions can be registered in the gateway apparatus 10 using the telephone apparatus, the PC and the like. Moreover, in the telephone apparatus 11, the contents of the announcement are output from the display apparatus 45, the speaker 463 and the like, which are disconnection informing means. In the case where the announcement is transmitted in the form of the speech signals, the contents of the announcement are output from, for example, the speaker in the handset of the telephone apparatus of the other party. When the telephone apparatus of the other party is compatible with the communication system, then the contents of the announcement can also be output to the display apparatus and the like.

Figure 7A:
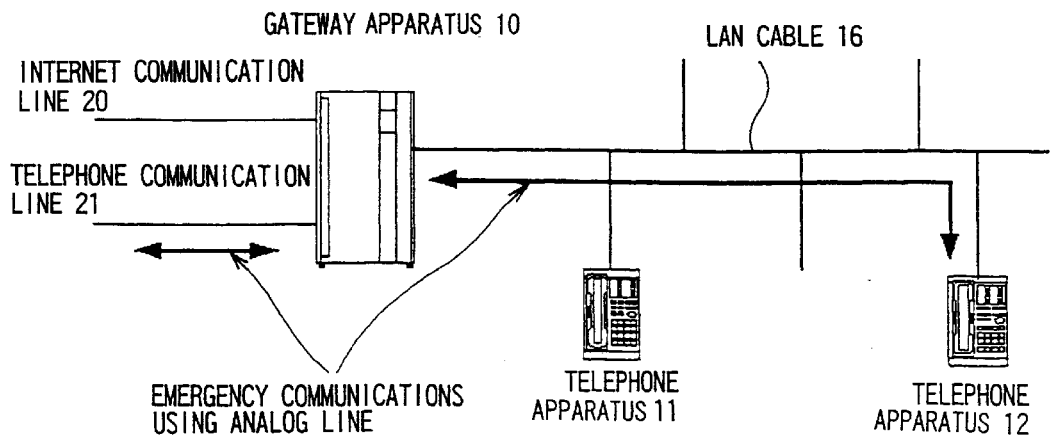
FIGS. 7A to 7C are conceptual diagrams for illustrating the switching of the communication state in the case where particular communications are performed from the telephone apparatus.

When the gateway apparatus 10 has made the announcement for a given length of time, it disconnects the communications being performed using the telephone communication line 21 and transmits signals for the emergency call using the telephone communication line 21 (see FIG. 7A).

Figure 7B:
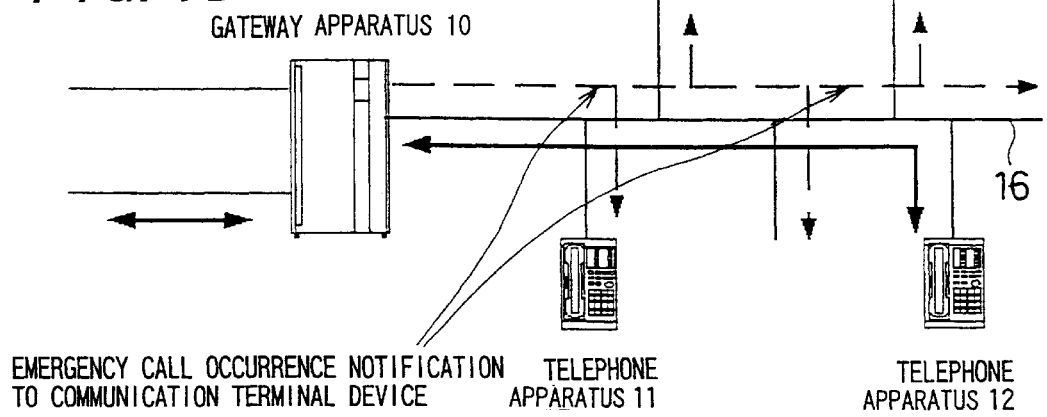

Upon the establishment of the communications for the emergency call, the control apparatus 38, which is particular notification means, transmits a notification of occurrence of an emergency call, which is particular notification information, to the other communication terminal apparatuses (e.g., the Facsimile apparatus 13, the PC 14, and the network television 15) within the communication system as shown in FIG. 7B. The other communication terminal apparatuses that have received the emergency call occurrence notification receive the information on the occurrence of an emergency call and the telephone apparatus 12 that had made the emergency call. The received information is output from, for example, the display apparatus 45 and the speaker 463, which are particular informing means. The user can specify the telephone apparatus 12 that had made the emergency call using the received information, and if a network camera is connected within the communication system, then the user can check out the situation around the telephone apparatus 12, for example, by operating the camera.

The processes to be performed by the apparatuses within the communication system when a call to a particular telephone number is made are registered in a process table beforehand, which is an operation table as shown in FIG. 3B. In the process table, the process number, which is the operation number, and the process contents, which are predetermined operations, are registered and correspond to the process numbers in the particular/emergency number table in FIG. 3A. For the process contents, the names of apparatuses to be used and the processes are registered. As the name of the apparatus to be used, the names of predetermined apparatuses (e.g., telephone 1, telephone 2, FACSIMILE and air conditioner) are registered. As the process contents, predetermined processes (e.g., transferring packets for an emergency call occurrence notification, and transferring a switch-on packet) are registered. In the case where all the apparatuses are intended to be used, the name of the apparatus to be used is designated as "ALL."

For example, when an emergency call to a police station, which is the predetermined information related to the operation number, is made from a telephone apparatus within the communication system, the control apparatus 42 of the telephone apparatus, which is predetermined information notification means, notifies the control apparatus 38 of the gateway apparatus 10 of an emergency call to a police station, which is the predetermined information. In the gateway apparatus 10, communications are started according to the selectable line "1" and the priority "SET" in the particular/emergency number table, and also the process of the process number "#001" in the process table is performed in accordance with the process number "#001". The process number "#001" in the process table represents "ALL" for the apparatus to be used, and "transferring a packet for an emergency call occurrence notification". Therefore, when an emergency call to a police station is made, the gateway apparatus 10 transfers packets for an emergency call occurrence notification to all of the apparatuses within the communication system. This process table is stored in the storage device 36, which is predetermined operation storage means.

Figure 7C:
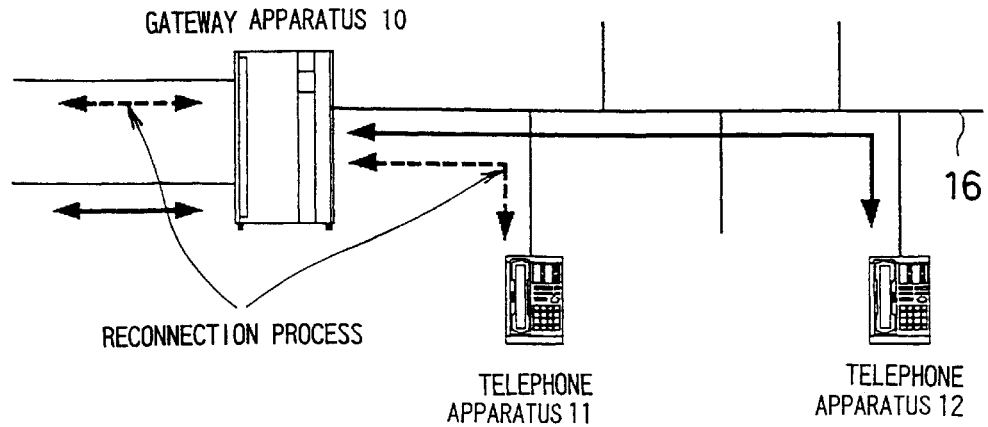

The gateway apparatus 10 performs a reconnection process to restore the communications over the telephone apparatus 11 that were disconnected by the transmission of an emergency call at the same time when notifying the occurrence of the emergency call as shown in FIG. 7C. The gateway apparatus 10 uses the Internet communication line 20 to carry out reconnection, for example, based on the telephone number information on the other party stored in the storage device 36.

Figure 8:
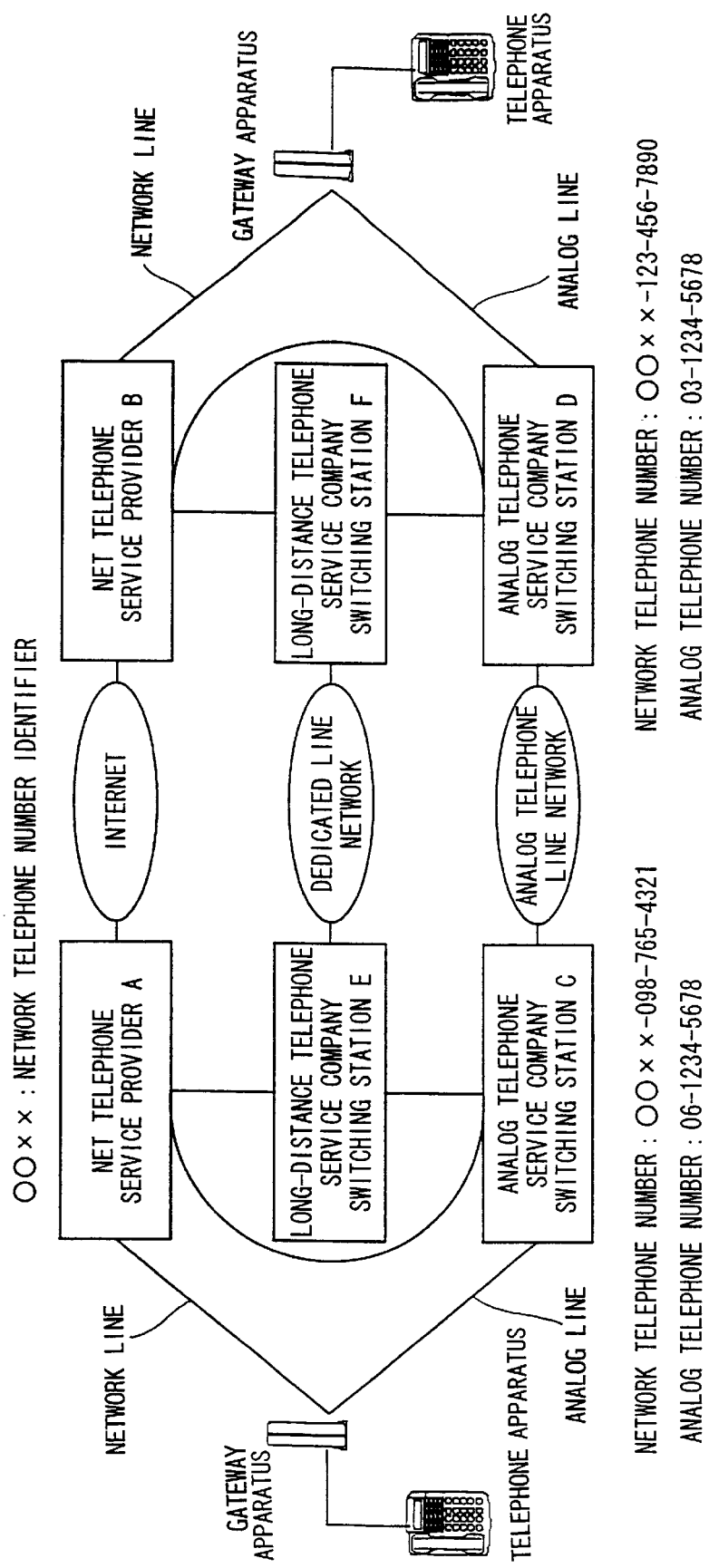
FIG. 8 is a diagram schematically showing communication routes for telephone communications using the gateway apparatus.

FIG. 8 is a diagram schematically showing communication routes for telephone communications using the gateway apparatus. As shown in FIG. 7C, the gateway apparatus performs the reconnection process to restore the communications that were disconnected by the transmission of the emergency call. In this case, there are a plurality of possible communication routes depending on a usable communication line and the conditions of the telephone apparatus to be reconnected. It is assumed that a number for identification such as 00xx from 00xx-123-456-789 is set as a network telephone number that is assigned to a network telephone connected to a digital communication line (Internet communication line 20).

In the case of making a call to a network telephone having a network telephone number using the digital communication line, signals are transmitted from a network telephone service provider A via the Internet to a network telephone service provider B and then to the telephone apparatus on the other party side. In the case of making a call to a telephone apparatus having an analog telephone number (e.g., 03-1234-5678) using the digital communication line, when the identification number 00xx is not detected in the telephone number to which the call is directed, then the network telephone service provider A sends a receiving request to a switching station of an analog telephone service company C or a switching station of a long-distance telephone service company E, and then to an switching station of an analog telephone service company D or an switching station of a long-distance telephone service company F via an analog communication line or a dedicated line. In the case where the long-distance telephone service is used, the receiving request is sent from the switching station of the long-distance telephone service company F to the switching station of the analog telephone service company D and then transmitted from the switching station of the analog telephone service company D to the telephone apparatus on the other party side.

In the case of making a call to the network telephone apparatus using the analog communication line (telephone communication line 21), the switching station of the analog telephone service company C sends a receiving request to the network telephone service provider A, when it detects the identification number 00xx in the telephone number to which the call is directed. The network telephone service provider A sends the receiving request to the network telephone service provider B via the Internet and then the network telephone service provider B transmits it to the telephone apparatus on the other party side. In the case of making a call to an analog telephone apparatus using the analog communication line, signals are transmitted from the switching station of the analog telephone service company C via the analog communication line to the switching station of the analog telephone service company D and then to the telephone apparatus on the other party side.

The gateway apparatus 10 performs the reconnection process described above also when the communication line being used becomes unusable, for example, because of a malfunction of the device on the telephone service company side. The determination that the communication line is unusable is made, for example, by detecting the line voltage with respect to the telephone communication line or based on the status of sending/receiving packets to/from a network telephone server (e.g., time out in receiving reply packets from the other party) with respect to the network telephone through the Internet communication line.

Hereinafter, the details of the various processes of the gateway apparatus 10 will be described by means of flowcharts.

Figure 9:
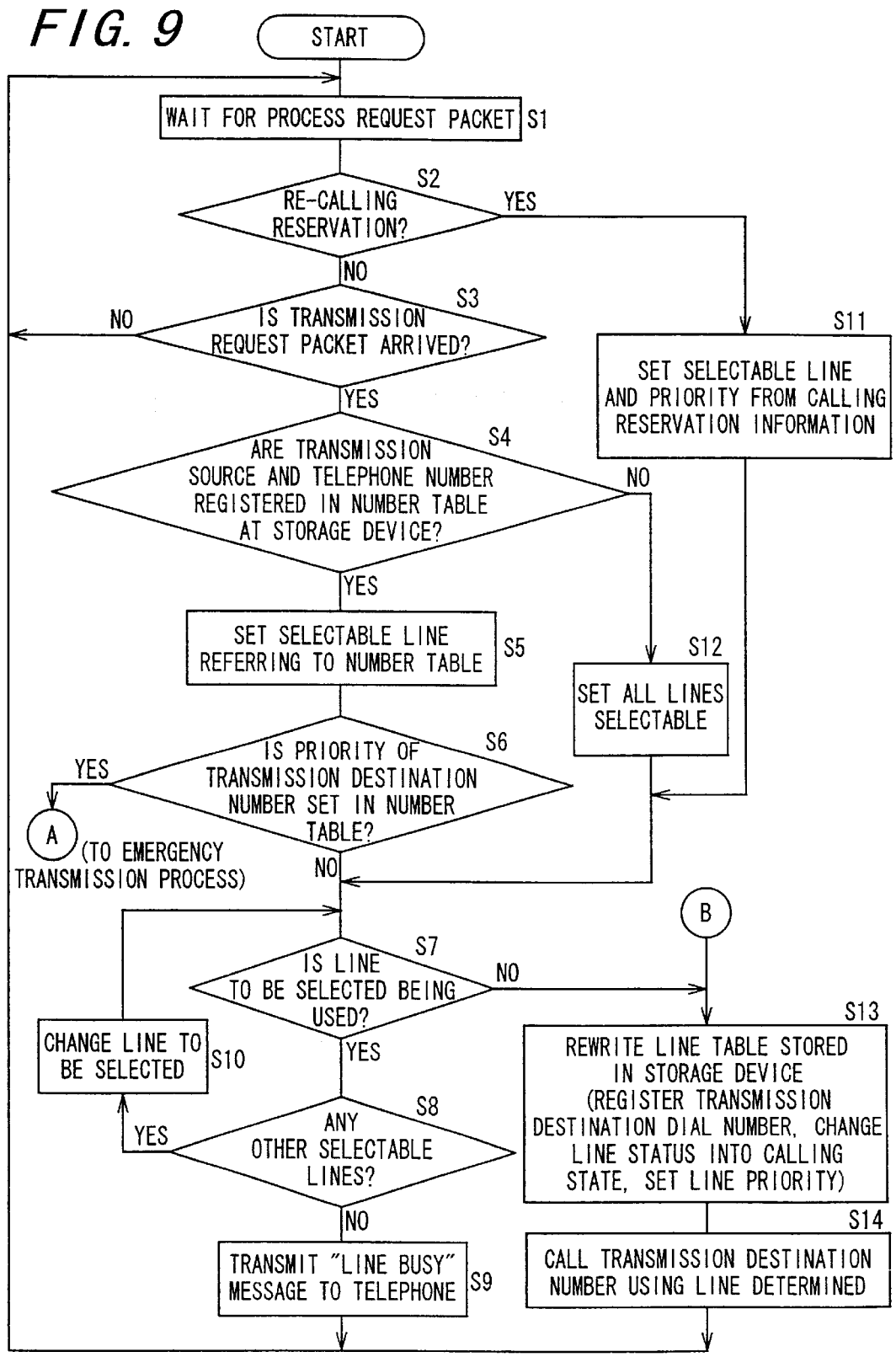
FIG. 9 is a flowchart showing a call-starting process of the gateway apparatus.

FIG. 9 is a flowchart showing the call-starting process of the gateway apparatus 10. First, in step S1, the gateway apparatus 10 waits while being ready to receive a data packet requesting a call-starting process from a telephone apparatus within the communication system. In step S2, it is determined whether or not re-calling reservation information is registered. In the case where the information is registered, the procedure goes to step S11. In the case where the information is registered, the procedure goes to step S3.

In step S11, the selectable line and the priority of the calling reservation information are set and the procedure goes to step S7. In step S3, it is determined whether or not a dial data packet requesting transmission is received from a telephone apparatus. In the case where the dial data packet is not received, the procedure goes back to step S1. In the case where the dial data packet is received, the procedure goes to step S4. In step S4, the telephone number of the other party included in the received dial data packet is compared with telephone numbers registered in the particular/emergency number table stored at the storage device 36 to determine whether there is a match. In the case where there is a match, the procedure goes to step S5. In the case where there is no match, the procedure goes to step S12.

In step S12, all of the communication lines are set as being selectable and the procedure goes to step S7. In step S5, a selectable communication is set referring to the particular/emergency number table. In step S6, it is determined whether the priority is set by referring to the particular/emergency number table. In the case where the priority is set, the procedure goes to the emergency call-starting process (see FIG 10.) described below. In the case where the priority is not set, the procedure goes to step S7.

In step S7, it is determined whether the communication line to be selected is currently in use. In the case where it is in use, the procedure goes to step S8. In the case where it is not in use, the procedure goes to step S13. In step S8, it is determined whether or not any other communication lines are set as being selectable. In the case where other lines are selectable, the procedure goes to step S10. In the case where no other lines are selectable, the procedure goes to step S9. In step S9, a message indicating that the communication line is busy is transmitted to the telephone apparatus requesting transmission and the procedure goes back to step S1. In step S10, the communication line to be selected is switched to another selectable communication line and the procedure goes back to step S7.

In step S13, a line use status table containing the telephone number information of the other party that is stored at the storage device 36 is rewritten. More specifically, the telephone number of the other party to be communicated with is registered, the line status is changed from an open state ("FREE") to a calling state ("CALLING") and the priority is set with respect to the communication line to be used. In step S14, a call-starting process is performed using the selected communication line. FIG. 3C shows an example of the line use status table. In the line use status table, line numbers, line types, line statuses, the telephone numbers to which a call is made, the names of the parties to which a call is made and the priority are registered. The line status is represented by "FREE," "TALK," "RINGING" or "CALLING." "FREE" indicates that the line is open, "TALK" indicates that the line is busy for communications, "RINGING" indicates that the line is receiving a call, and "CALLING" indicates that the line is making a call.

Figure 10:
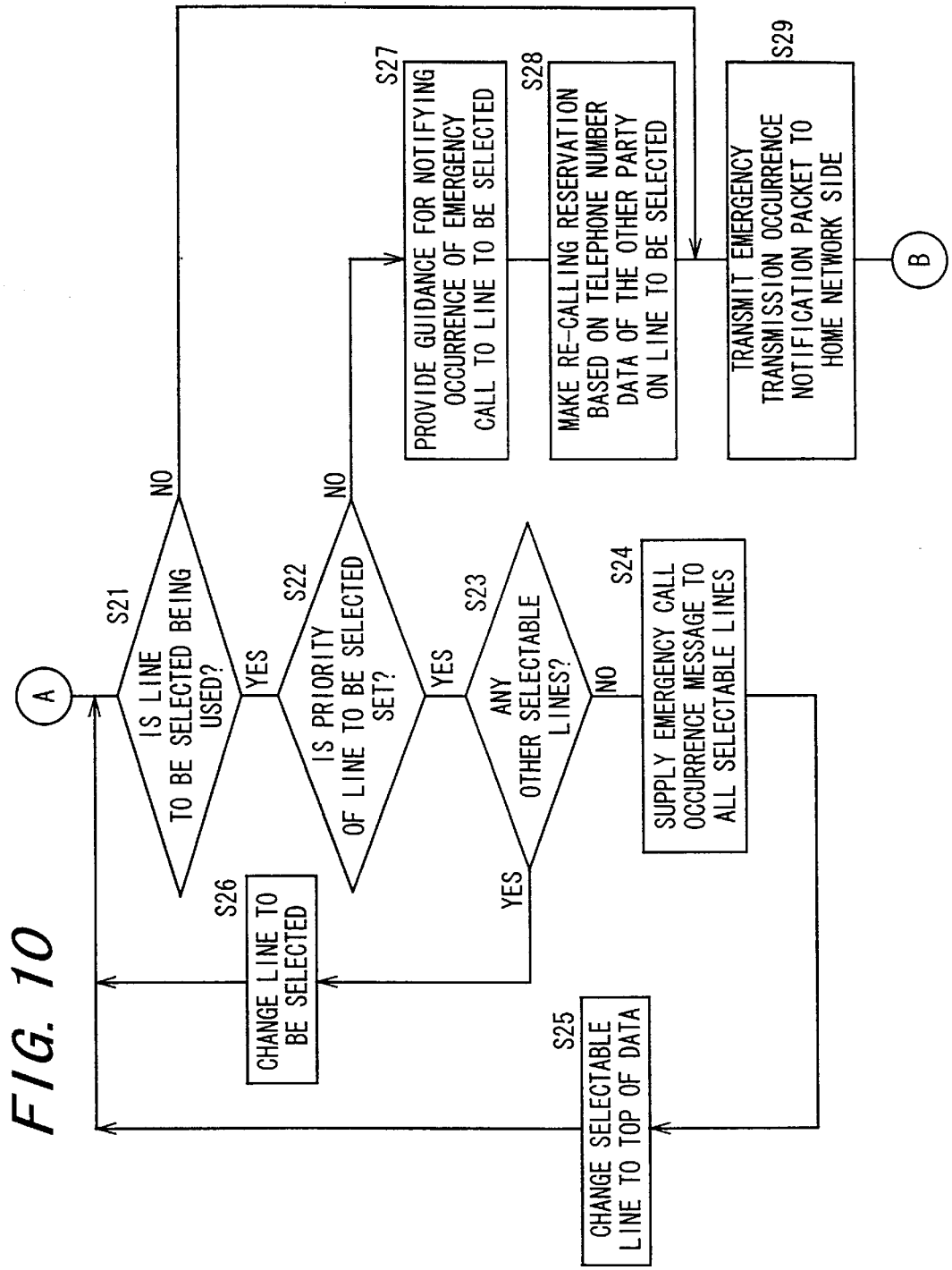
FIG. 10 is a flowchart showing an emergency call-starting process of the gateway apparatus.

FIG. 10 is a flowchart showing the emergency call-starting process of the gateway apparatus 10. In step S21, it is determined whether the communication line to be selected is currently in use. In the case where the line is in use, the procedure goes to step S22. In the case where the line is not in use, the procedure goes to step S29. In step S22, it is determined whether the priority is set for the communication line to be selected. In the case where the priority is set, the procedure goes to step S23. In the case where the priority is not set, the procedure goes to step S27. In step S23, it is determined whether or not any other selectable communication lines are set. In the case where other lines are selectable, the procedure goes to step S26. In the case where no other line is selectable, the procedure goes to step S24. In step S26, the communication line to be selected is changed to another selectable communication line, and the procedure goes back to step S21. In step S24, a message indicating the occurrence of an emergency call is sent to the selectable communication line. In step S25, the selectable communication line is moved to the top on the line use status table and the procedure goes back to step S21.

In step S27, an announcement about making an emergency call and disconnection of the communications is made to the telephone apparatus that is currently communicating using the communication line to be selected and the telephone apparatus of the other party with which this telephone apparatus is communicating. In step 28, the telephone number of the other party currently in communications through the communication line to be selected is acquired to make re-calling reservation. In step S29, the other communication terminal apparatuses within the communication system are notified of the occurrence of an emergency call, and the procedure goes to step S13 in FIG. 9.

Figure 11:
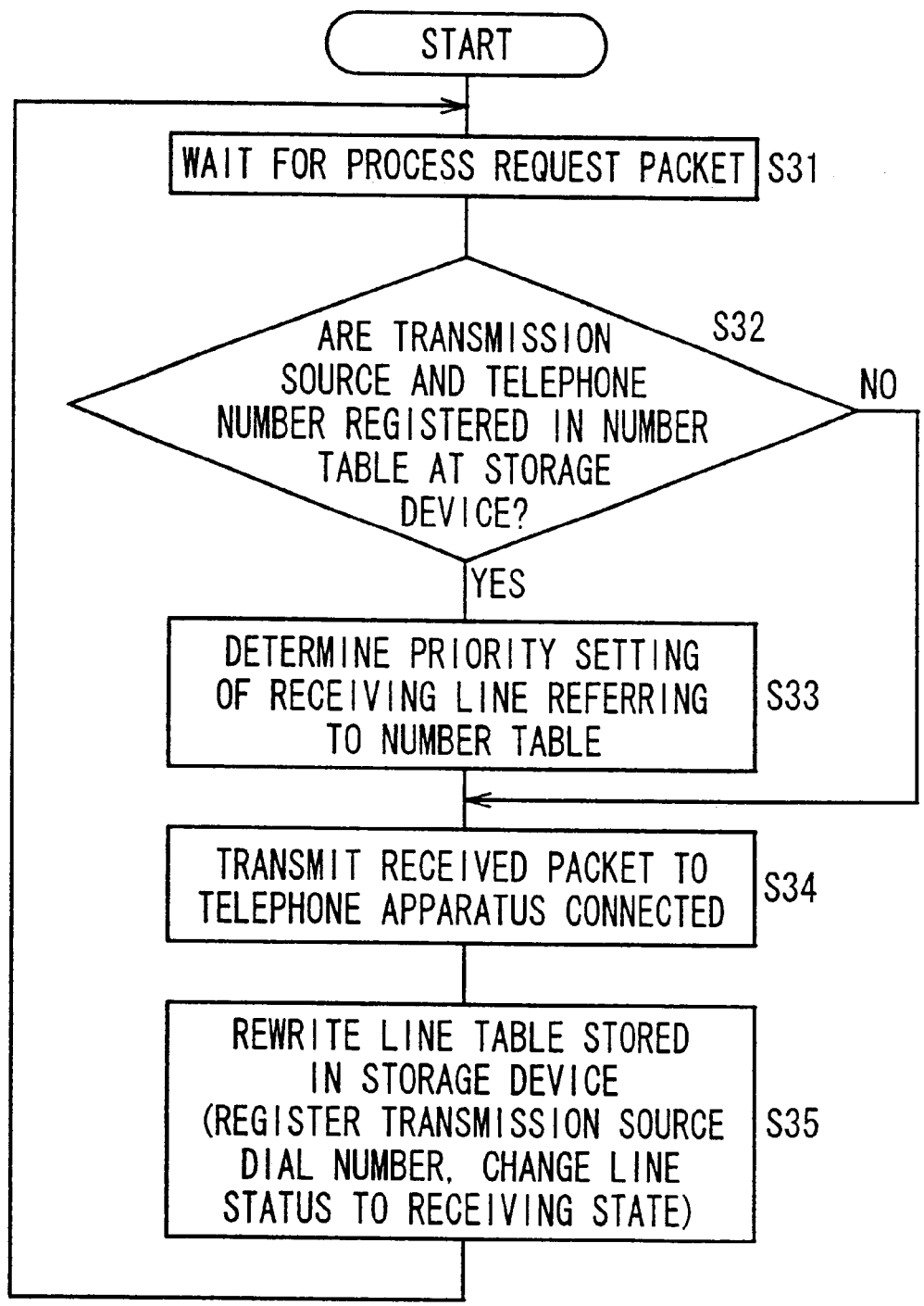
FIG. 11 is a flowchart showing a receiving process of the gateway apparatus.

FIG. 11 is a flowchart showing the receiving process of the gateway apparatus 10. In step S31, the gateway apparatus 10 waits while being ready to receive a data packet requesting the receiving process from a communication line (Internet communication line 20 or telephone communication line 21) connected thereto. In step S32, when receiving the dial data packet requesting the receiving process, the telephone number of the transmission source included in the received dial data packet is compared with the telephone numbers registered in the particular/emergency number table stored in the storage device 36 to determine whether there is a match. In the case where there is a match, the procedure goes to step S33. In the case where there is no match, the procedure goes to step S34.

In step S33, the priority of the communication line that received a call is set, referring to the particular/emergency number table. In step S34, a reception notification data packet is transmitted to the telephone apparatus that is to receive the call. In step S35, the line use status table is rewritten and the procedure goes back to step S31. More specifically, the telephone number of the transmission source to be communicated with is registered, the line status is changed from the open state ("FREE") to the receiving state ("RINGING") and the priority is set with respect to the communication line to be used.

Figure 12:
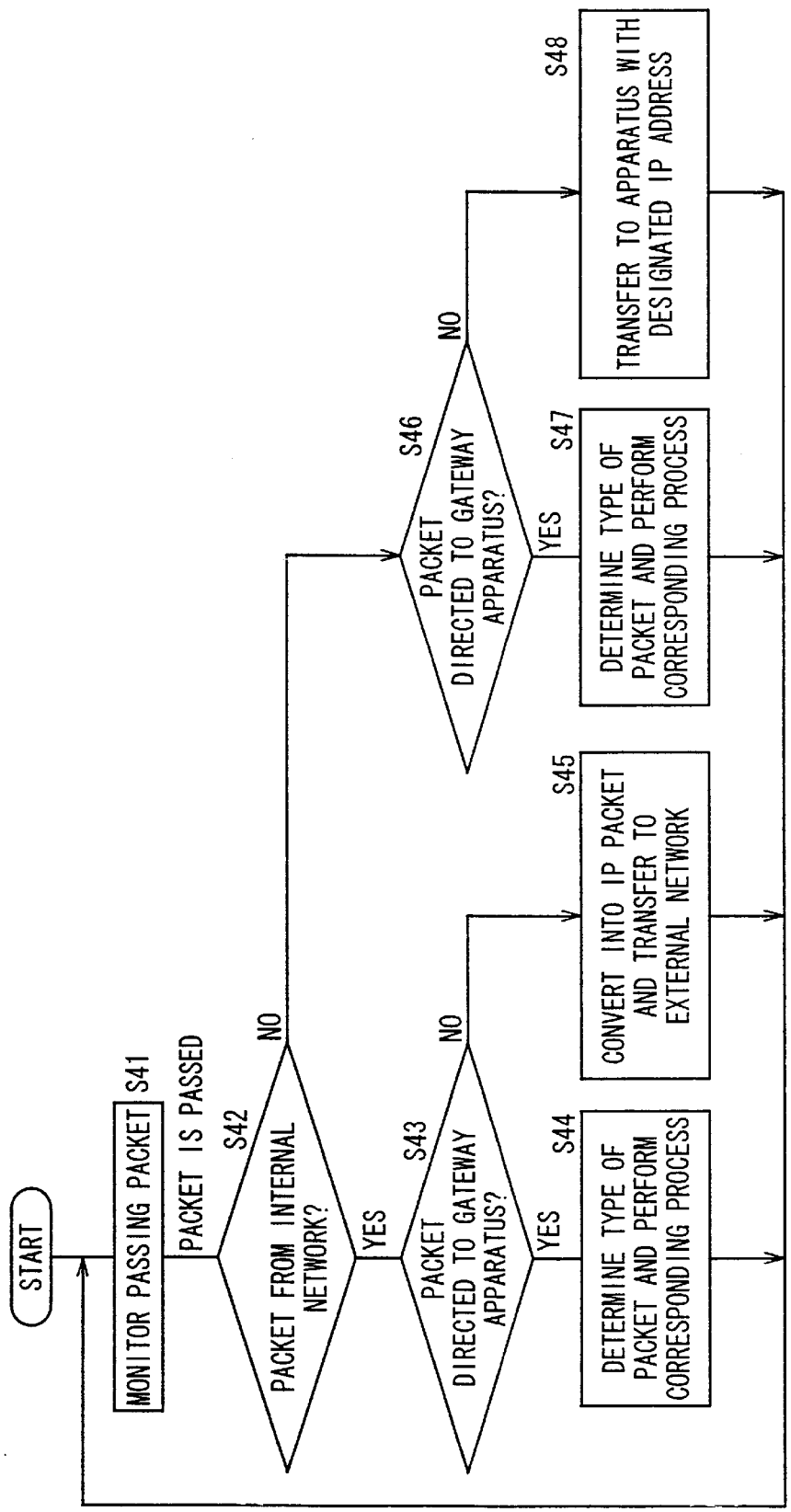
FIG. 12 is a flowchart showing a LAN control process of the gateway apparatus.

FIG. 12 is a flowchart showing the LAN control process of the gateway apparatus 10. In step S41, a passing data packet is monitored. In step S42, it is determined whether or not the passing data packet has been transmitted from the LAN within the communication system 100. In the case where it has been transmitted from the communication system 100, the procedure goes to step S43. In the case where it is not from the communication system 100, the procedure goes to step S46.

In step S43, it is determined whether the data packet is directed to the gateway apparatus 10. In the case where the data packet is directed to the gateway apparatus 10, the procedure goes to step S44. In the case where the data packet is not directed to the gateway apparatus 10, the procedure goes to step S45. In step S44, the type of the data packet is determined and the process according to the type is performed. In step S45, the data packet is converted into an IP packet and transmitted to the outside via the Internet communication line 20.

In step S46, it is determined whether the data packet is directed to the gateway apparatus 10. In the case where the data packet is directed to the gateway apparatus 10, the procedure goes to step S47. In the case where the data packet is not directed to the gateway apparatus 10, the procedure goes to step S48. In step S47, the type of the data packet is determined, and the process is performed in accordance with the type. In step S48, the data packet is transmitted to a communication terminal apparatus having an IP address that is designated by the data packet.

Figure 13:
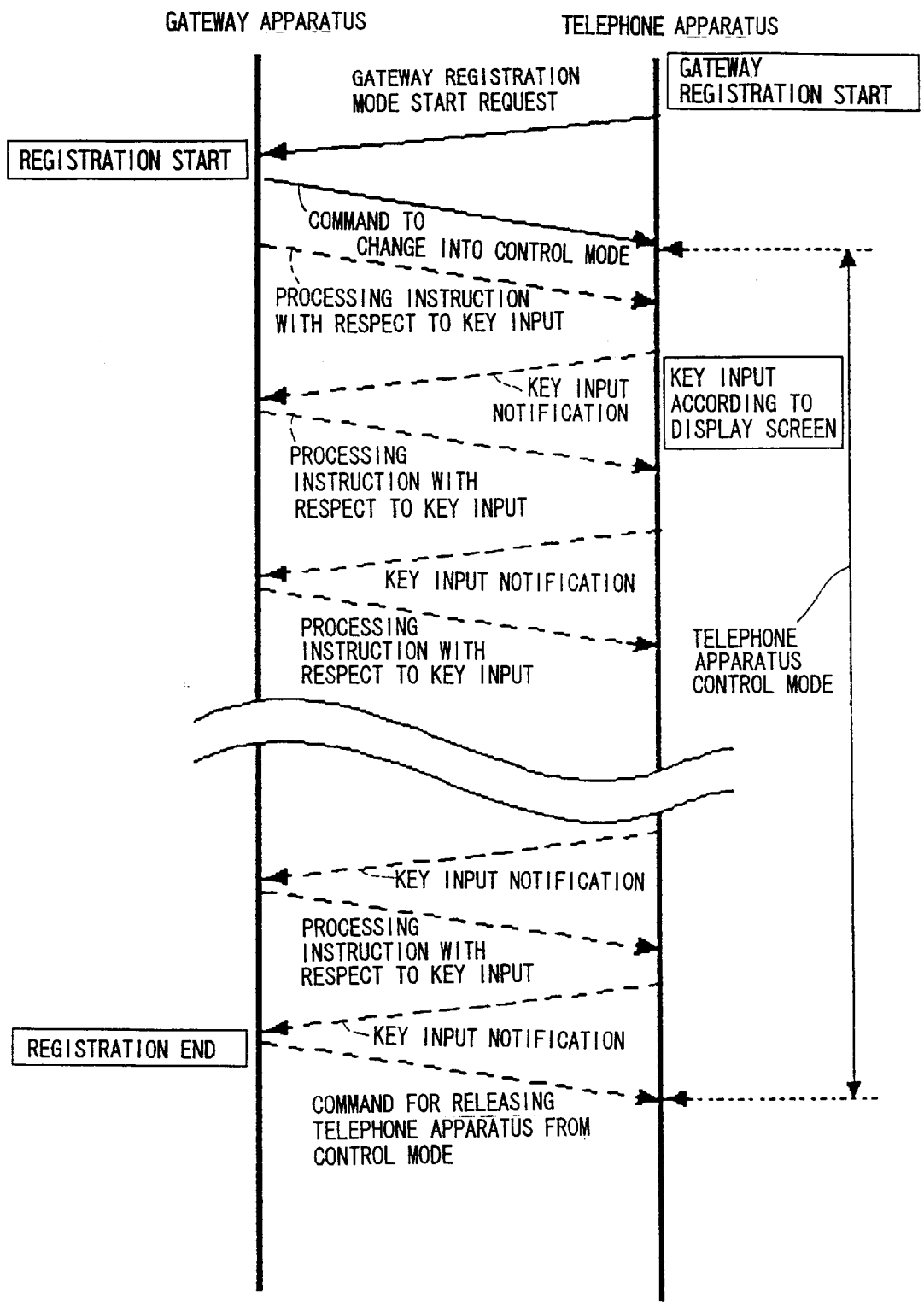
FIG. 13 is a sequence diagram showing a process for registering on a particular/emergency number table stored in the storage device.

FIG. 13 is a sequence diagram showing the registration process into the particular/emergency number table stored in the storage device 36. A request for starting a registration mode is transmitted from the telephone apparatus 11 to the gateway apparatus 10. The registration mode start request is transmitted as data packets including, for example, display capability (e.g., the number of displayable characters) and the key information of the telephone apparatus 11. In response to the registration mode start request, the gateway apparatus 10 transmits to the telephone apparatus 11 a command to change the mode to a control mode and a command for processing with respect to a key input. At the telephone apparatus 11, registration contents are input by performing an input operation with keys according to the display screen. The key input is notified from the telephone apparatus 11, and then the command for processing with respect to the key input is transmitted from the gateway apparatus 10. This procedure is repeated, and the registration process ends when a command to end the control mode is transmitted from the gateway apparatus 10.

As described above, even when the communications over the telephone apparatus are disconnected by making an emergency call, the other party of the communications before the disconnection is stored, and therefore the user who was engaged in the communications does not have to perform an operation for reconnection. Moreover, the users who are subjected to the disconnection of their communications are notified of the fact that the communications will be disconnected for transmission for an emergency call, and the other users are notified of, for example, the occurrence of the emergency call and the location of the telephone apparatus that made the emergency call. Thus, the convenience for all users can be improved.

Figure 14:
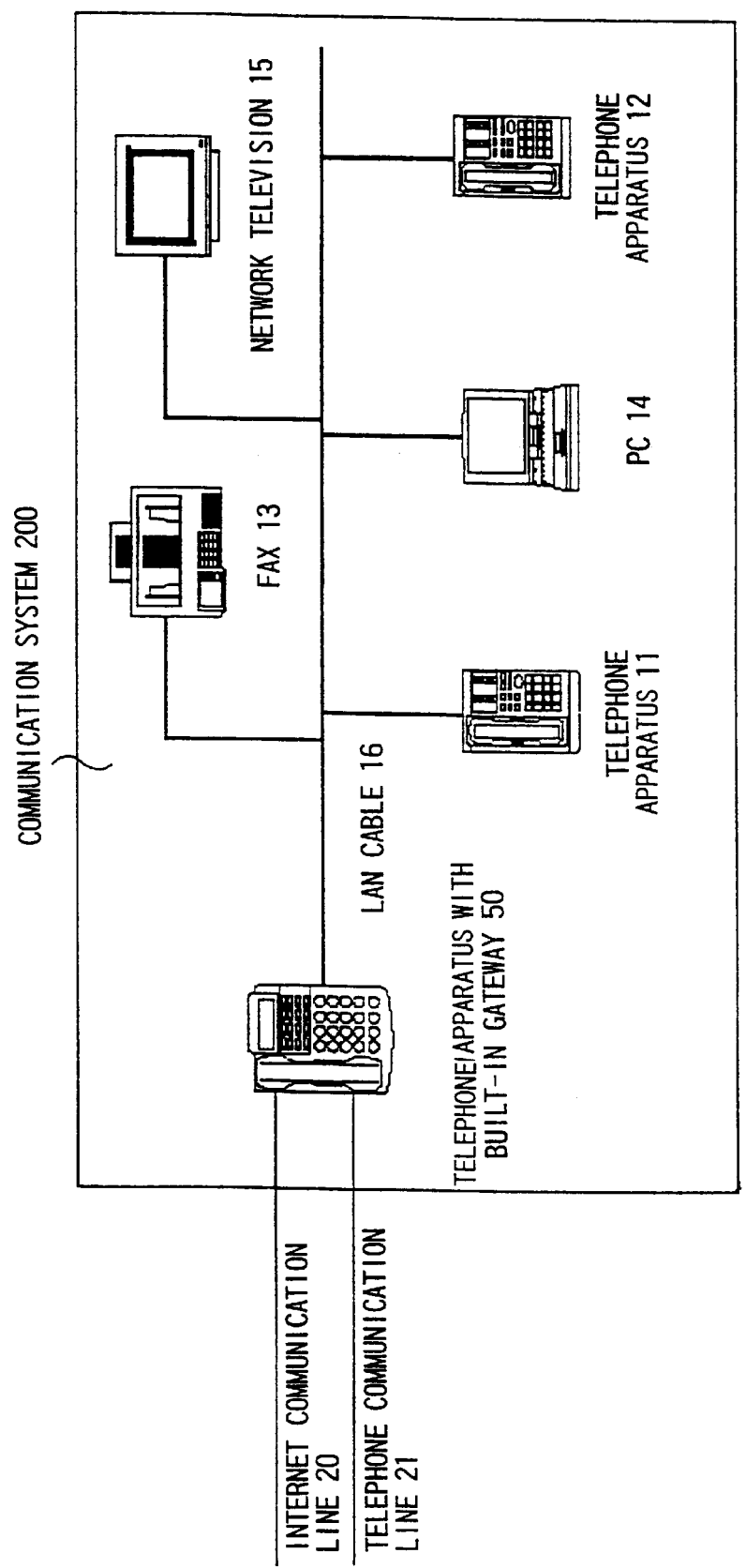
FIG. 14 is a diagram showing the configuration of a communication system of another embodiment of the invention.

FIG. 14 is a diagram showing the configuration of a communication system 200 of another embodiment of the invention. The communication system 200 includes a telephone apparatus 50 with a built-in gateway, which is a communication control apparatus, telephone apparatuses 11 and 12, a facsimile apparatus 13, a personal computer (PC) 14 and a network television 15, which are communication terminal apparatuses. These apparatuses are connected to each other via a LAN cable 16 such as an Ethernet cable. The communication system 200 is different from the communication system 100 shown in FIG. 1 only in that the gateway apparatus 10 is replaced by the telephone apparatus 50 with the built-in gateway, and the other apparatuses, the communication lines, the LAN cable and the like are the same as those in the communication system 100, so that the description thereof will be omitted.

Figure 15:
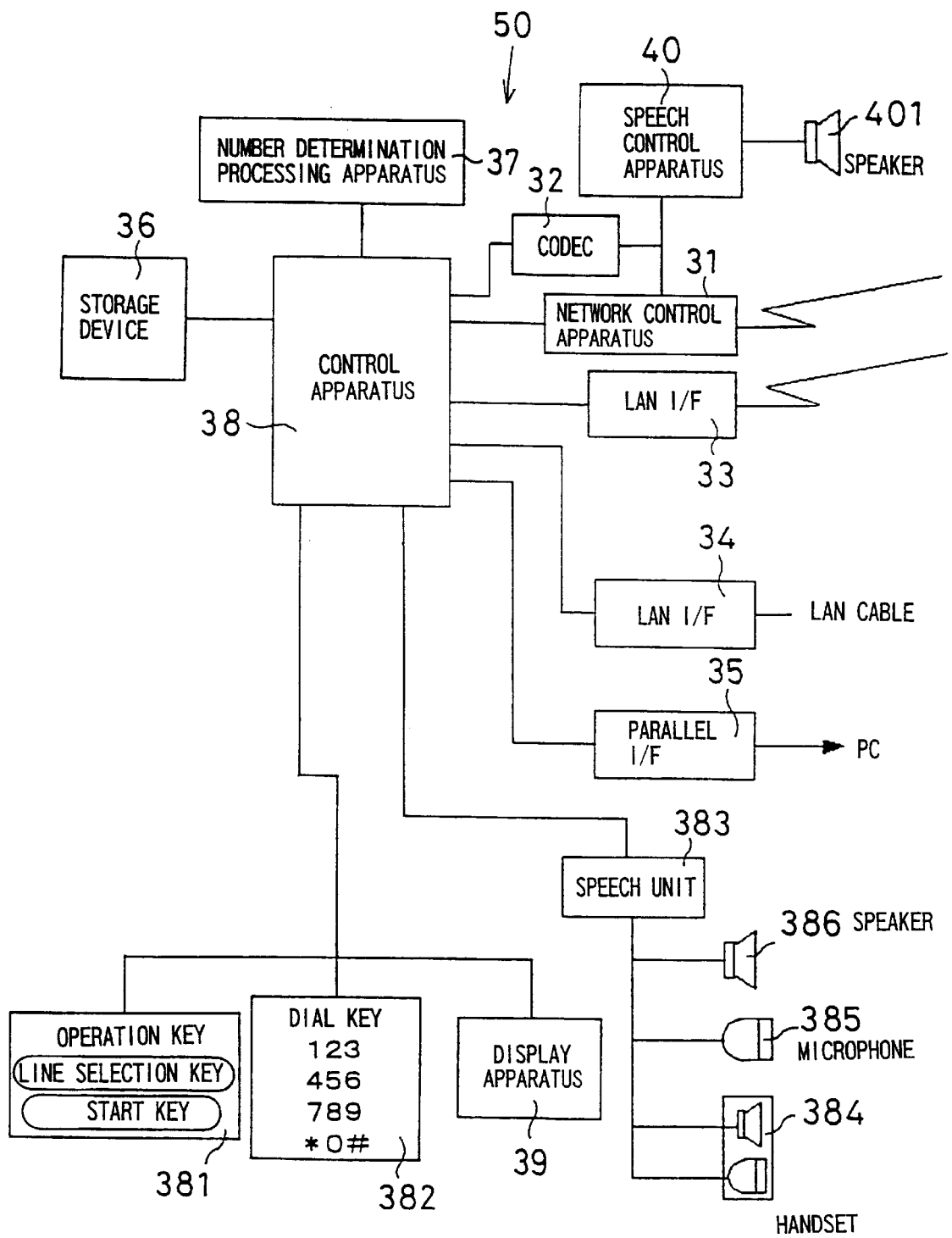
FIG. 15 is a block diagram showing the configuration of a telephone apparatus with a built-in gateway.

FIG. 15 is a block diagram showing the configuration of the telephone apparatus 50 with the built-in gateway. The telephone apparatus 50 with the built-in gateway includes a network control apparatus 31, a CODEC 32, LAN I/Fs 33 and 34, a parallel I/F 35, a storage device 36, a number determination processing apparatus 37, a control apparatus 38, a display apparatus 39, a speech control apparatus 40, operation keys 381, dial keys 382, a speech unit 383, a handset 384, a microphone 385, a speaker 386 and a speaker 401. Portions that carry out the same operations as those in the block diagram shown in FIG. 2 bear the same reference numerals and the description thereof will be omitted.

The operation keys 381 and the dial keys 382 are used for input when the user uses the various functions of the telephone apparatus 50 with the built-in gateway or when the user makes telephone calls. The speech unit 383 outputs analog speech signals from the control apparatus 38 from the handset 384 or the speaker 386, and also outputs speech signals input from the handset 384 or the microphone 385 to the control means 38. The handset 384 is used when the user performs speech communications and is provided with a microphone and a speaker. The microphone 385 and the speaker 386 are used to input an answering message or to reproduce a recorded message.

The function of the telephone apparatus 50 with the built-in gateway as the gateway apparatus is the same as that in the above-described embodiments, so that the call-starting process thereof will be described below. When the operation keys 381 and the dial keys 382 are operated by a user, the control apparatus 38 determines whether to perform communications using the Internet communication line 20 or using the telephone communication line 21, referring to the particular/emergency number table stored in the storage device 36, and performs the call-starting process. With this call-starting process, a communication route between the telephone apparatus 50 with the built-in gateway and an external telephone apparatus is established. The speech signals input from the handset 384 and the microphone 385 are converted according to the communication line that is being used, and then transmitted to the external telephone apparatus. In the case where speech signals from the external telephone apparatus are received, the speech signals are output from the handset 384 or the speaker. In the case of speech data packets, the speech data packets are converted into the speech signals and then output.

In this embodiment, the same effect as in the above embodiments can be achieved. In addition to that, even when the function of the gateway apparatus cannot be used as in the case of blackout, power is supplied from the telephone communication line and analog telephone communications can be performed because the function of the gateway apparatus and the function of the telephone apparatus are integrated.

Figure 16:
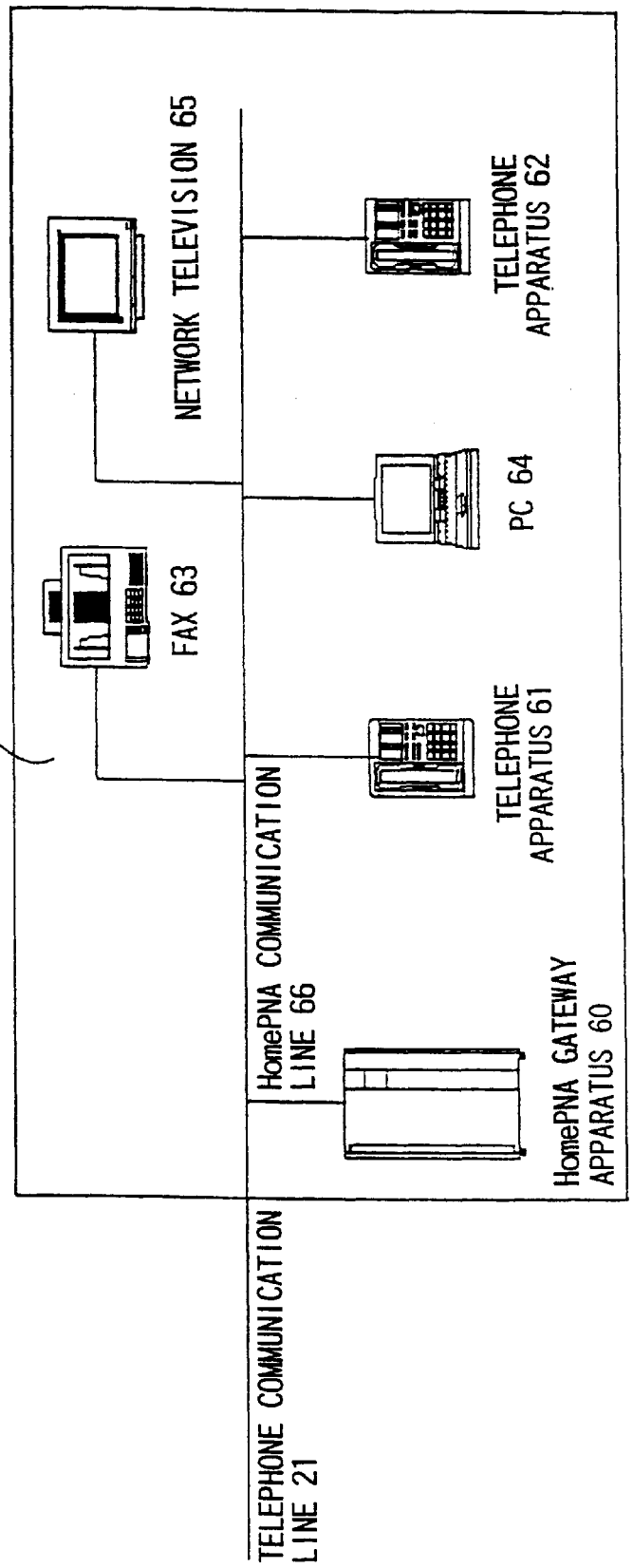
FIG. 16 is a diagram showing the configuration of a communication system of another embodiment of the invention.

FIG. 16 is a diagram showing the configuration of a communication system 300 of another embodiment of the invention. The communication system 300 includes a gateway apparatus 60, which is a communication control apparatus, telephone apparatuses 61 and 62, a facsimile apparatus 63, a personal computer (PC) 64 and a network television 65, which are communication terminal apparatuses. These apparatuses are connected to each other via a telephone communication line 21. Communications are performed within the communication system 300 according to the HomePNA standard.

With the HomePNA standard, it is possible to transfer both telephone signals in the analog form, which is a particular communication method, and data signals in the digital form over the same telephone communication line without interference. The operations and the functions of the PC 64 and the network television 65 are the same as those of the corresponding apparatuses shown in FIG. 1 and the only difference is that each of the PC 64 and the network television 65 is capable of connecting to the telephone communication line instead of the LAN I/F and provided with an I/F under the HomePNA standard. The HomePNA gateway apparatus 60 is linked with a HomePNA communication line 66 (telephone communication line 21) within the communication system 300. The HomePNA gateway apparatus 60 monitors the data signals and the telephone signals transferred over the HomePNA communication line 66 and controls each of the communication terminal apparatuses within the communication system 300. The telephone apparatuses 61 and 62 have both the function of the network telephone apparatus under the HomePNA standard and the function of the analog telephone apparatus.

In the case where a call in the form of the analog telephone signals is received from the telephone communication line 21, the telephone apparatus 61 or 62 performs the receiving process of a conventional commonly used analog telephone apparatus. When the off-hook operation is performed, then a communication route is established by the process as the analog telephone apparatus. Similarly, in the case where the telephone apparatus 61 or 62 performs the call-starting process as the analog telephone apparatus, a communication route is established by the process as the analog telephone apparatus. In the case where a call in the form of data packets is received from the telephone communication line 21, data packets for notifying that a call is received are transmitted from the gateway apparatus 60 to the telephone apparatus 61 or 62. The telephone apparatus 61 or 62 that has received the data packets for notifying that a call is received performs the receiving and call-starting process and establishes a communication route. After the establishment of the communication route, the received speech data packets are transmitted via the gateway apparatus 60 to the telephone apparatus to which the communication route has been established. Voice signals input from the handset, for example, are converted into digital speech data packets in the telephone apparatus and transmitted to the gateway apparatus 60. The gateway apparatus 60 transmits the received speech data packets to the telephone communication line 21.

In the case where the telephone apparatus 62 makes an emergency call while the telephone apparatus 61 is communicating through an analog telephone, the gateway apparatus 60 makes an announcement for notifying that the communications will be disconnected to the telephone apparatus 61 and an external telephone apparatus that is communicating with the telephone apparatus 61. After a predetermined period of time has passed, control packets for disconnecting the communications are transmitted to the telephone apparatus 61. The telephone apparatus 61 that has received the control packets for disconnecting the communications disconnects the communications with or without the operation for disconnecting the communications by the user. When it is confirmed that the analog telephone communications have been disconnected, the gateway apparatus 60 performs the emergency call-starting process of the telephone apparatus 62 and establishes the communication route for the emergency call from the telephone apparatus 62. The moment that the gateway apparatus 60 establishes the communication route for the emergency call, the gateway apparatus 60 transmits data packets for informing the other communication terminal apparatuses of the occurrence of the emergency call using the HomePNA communication line 66, and performs the reconnection process for restoring the communications over the telephone apparatus 61.

Figure 17:
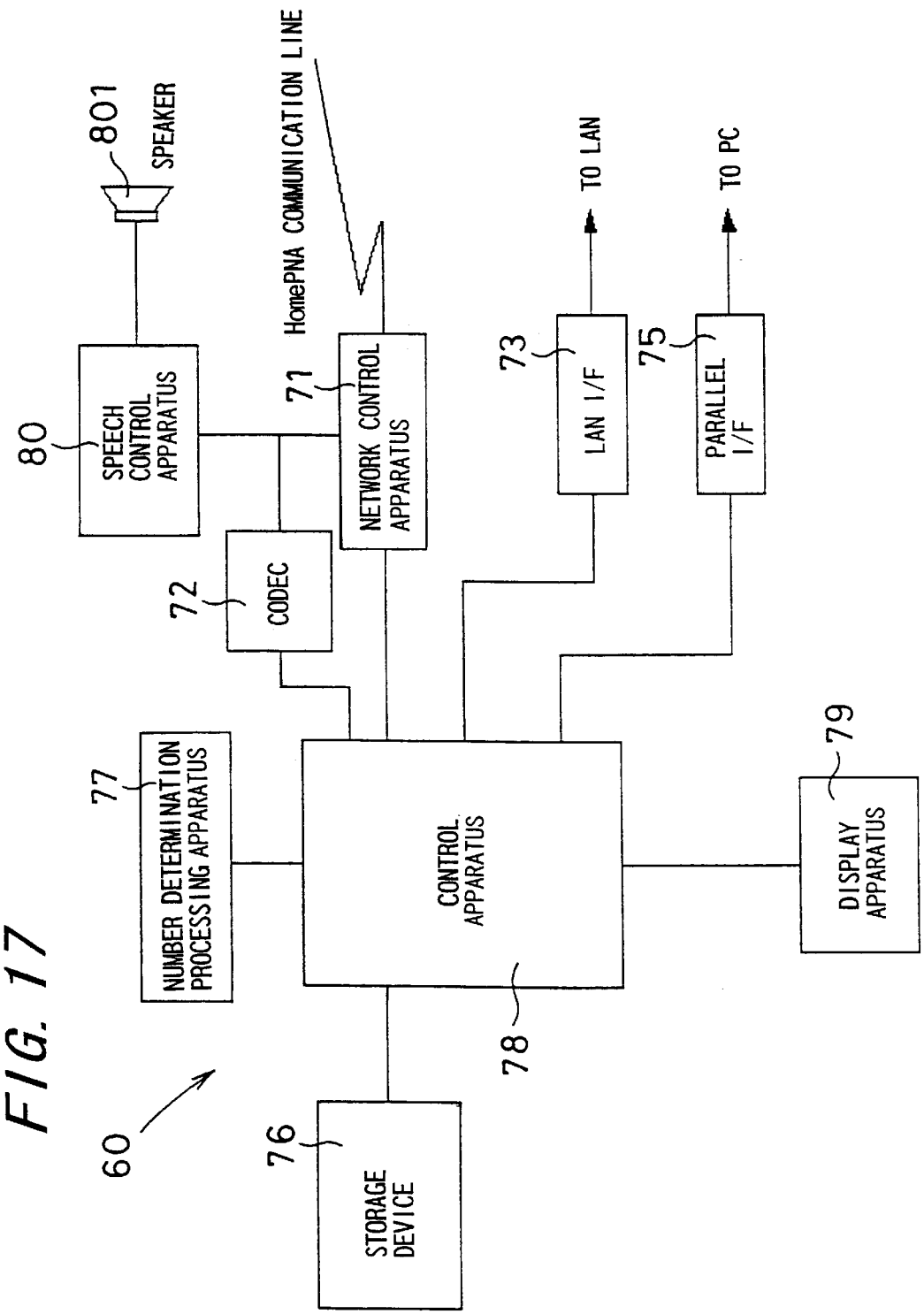
FIG. 17 is a block diagram showing the configuration of a gateway apparatus.

FIG. 17 is a block diagram showing the configuration of the gateway apparatus 60. The gateway apparatus 60 includes a network control apparatus 71, a CODEC 72, a LAN I/F 73, a parallel I/F 75, a storage device 76, a number determination processing apparatus 77, a control apparatus 78, a display apparatus 79, a speech control apparatus 80 and a speaker 801.

The network control apparatus 71 is connected to the telephone communication line 21, which is a HomePNA communication line, and sends/receives analog speech signals to/from an external communication terminal apparatus (telephone apparatus), and also functions as an I/F under the HomePNA standard. That is to say, the network control apparatus 71 sends/receives data packets to/from the external communication terminal apparatus. The CODEC 72 converses the analog speech signals into the speech data packets, and vice versa. The LAN I/F 73 is connected to a LAN cable (not shown) and sends/receives data packets to/from a communication terminal apparatus. The parallel I/F 75 is connected to a PC via a cable (not shown) and sends/receives data. The storage device 76 is identification information storage means for storing, for example, a telephone number or an IP address, which are identification information for identifying the other party of communications at the time of receiving or making a call. Moreover, the storage device 76 also stores the particular/emergency number table including telephone numbers for performing particular communications such as telephone numbers for emergency calls to a police station or a fire station. The number determination processing apparatus 77 determines whether or not a call is made for particular/emergency communications, referring to the particular/emergency number table stored in the storage device 76 at the time of making the call. Based on the determination result, the control apparatus 78, which is control and reconnection means, determines whether to perform analog telephone communications or network telephone communications, and also determines the operation of the entire apparatus in cooperation with a program stored in the storage device 76 and supplies commands to the entire apparatus. The display apparatus 79 displays the state of the gateway apparatus 60, an error notifications, and the like. The speech control apparatus 80 outputs the analog speech signals that have been converted in the CODEC 72 from the speaker 801.

Figure 18:
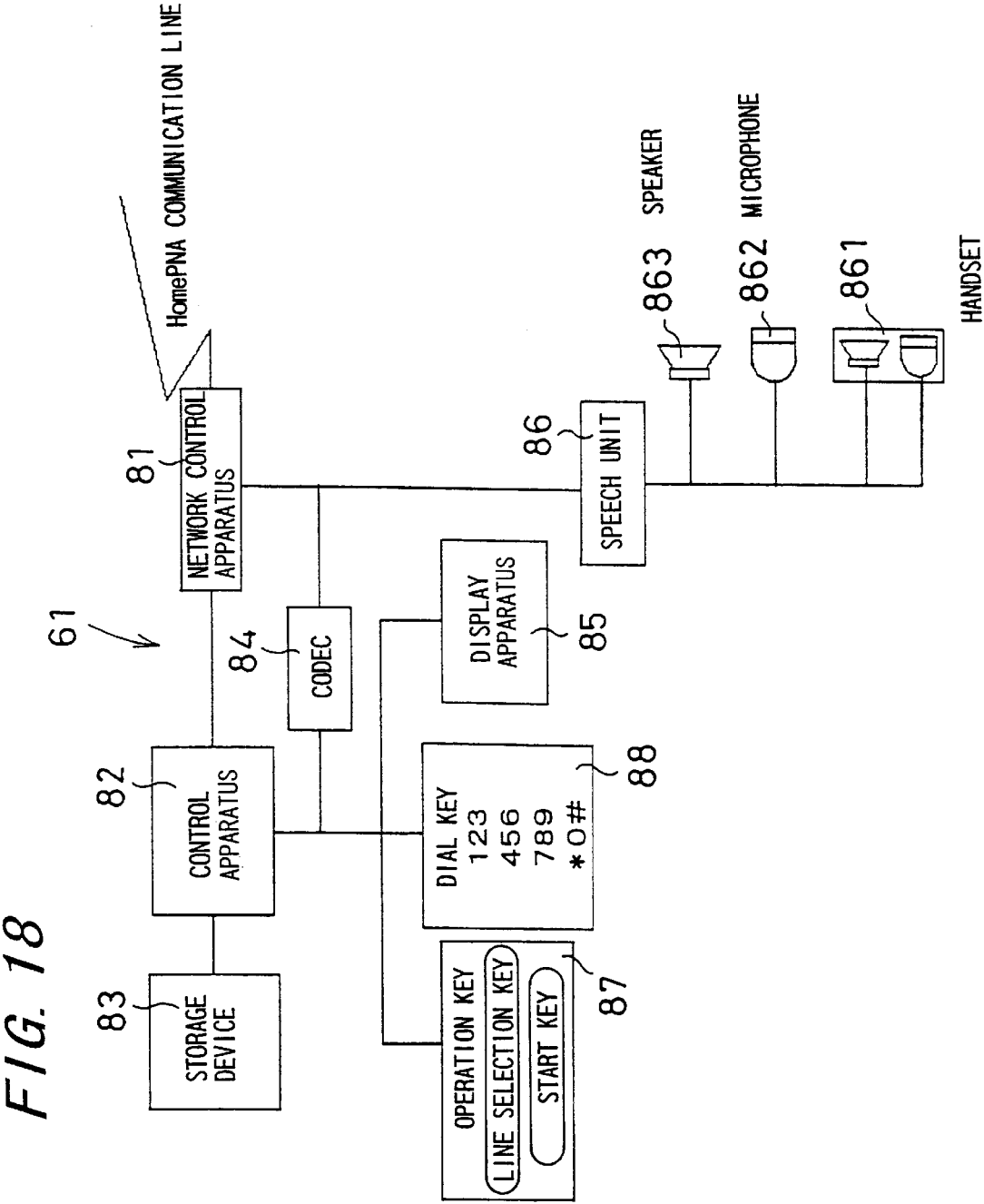
FIG. 18 is a block diagram showing the configuration of a telephone apparatus.

FIG. 18 is a block diagram showing the configuration of the telephone apparatus 61. The telephone apparatus 61 includes a network control apparatus 81, a control apparatus 82, a storage device 83, a CODEC 84, a display apparatus 85, a speech unit 86, operation keys 87, dial keys 88, a handset 861, a microphone 862 and a speaker 863. The network control apparatus 81 is connected to the telephone communication line 21, which is a HomePNA communication line, and sends/receives analog speech signals to/from an external communication terminal apparatus (telephone apparatus), and also functions as an I/F under the HomePNA standard. That is to say, the network control apparatus 81 sends/receives data packets to/from the gateway apparatus 60.

The control apparatus 82 outputs an instruction for operation to each of the apparatuses based on the received data packets. The data packets includes the control packets, which are predetermined to control the operation of the telephone apparatus 61, the speech data packets, which are the speech communication speech signals, and the dial data packets, which are telephone number information of the other party to which a call is made. The storage device 83 stores address data including telephone numbers, names and addresses, history data on making/receiving calls, an answering message and a recorded message.

The CODEC 84 converses analog speech signals into speech data packets, and vice versa. The display apparatus 85 displays the state. of the telephone apparatus 61, an error notification and the like. The speech unit 86 amplifies the analog speech signals that have been converted in the CODEC 84 and outputs the analog speech signals from the handset 861 or the speaker 863, and outputs speech signals input from the handset 861 or the microphone 862 to the CODEC 84.

The operation keys 87 and the dial keys 88 are used for input when the user uses the various functions of the telephone apparatus 61 or when the user makes telephone calls. The handset 861 is used when the user performs speech communications and provided with a microphone and a speaker. The microphone 862 and the speaker 863 are used to input an answering message or to reproduce and output a recorded message.

Figure 19:
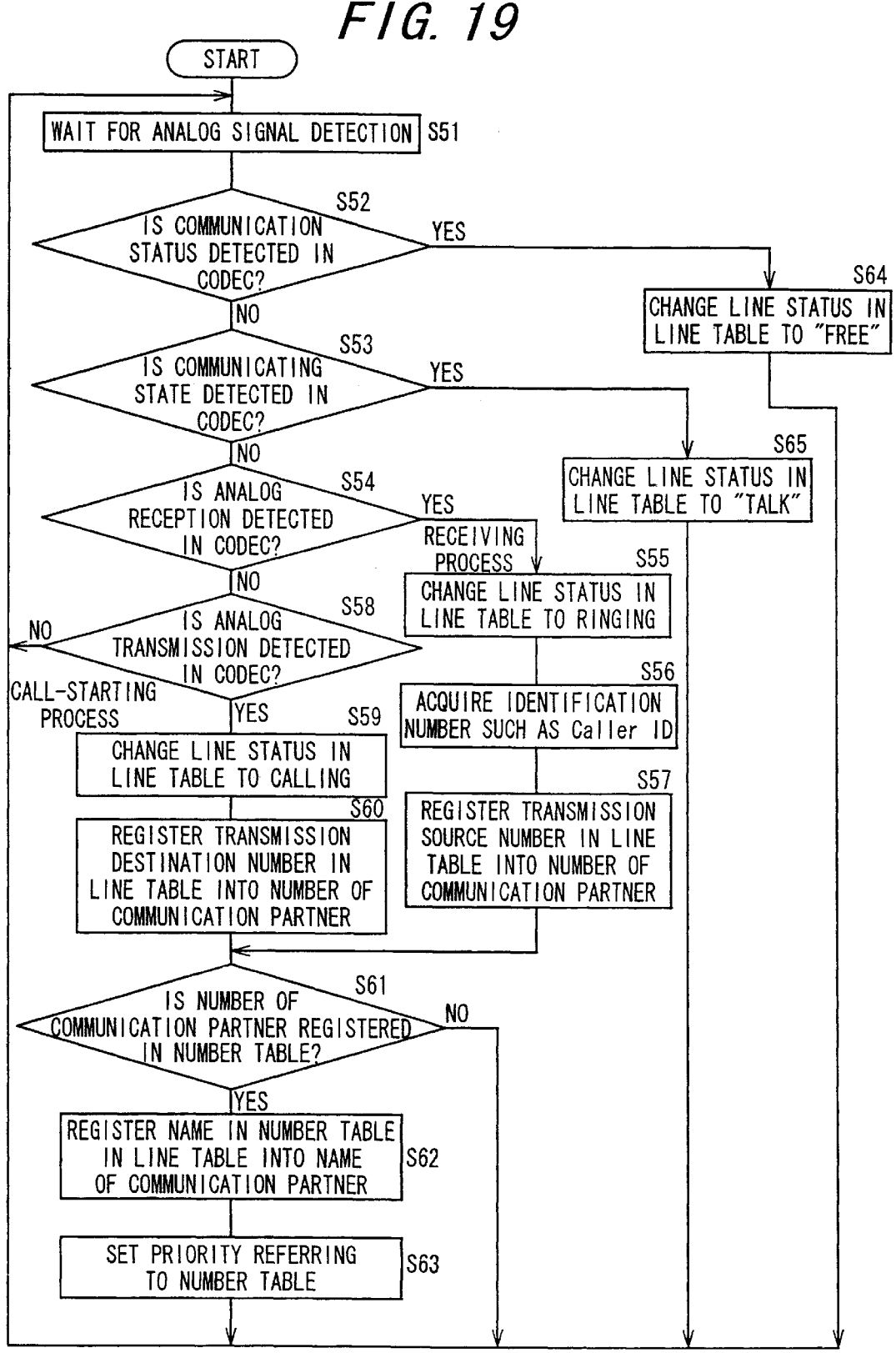
FIG. 19 is a flowchart showing a process for monitoring analog telephone communications by the gateway apparatus.

For the operation of the gateway apparatus 60, the data packet processing is the same as in the other embodiments described above. In this embodiment, however, it is necessary that the gateway apparatus 60 monitors the analog telephone communications for the purpose of performing the communications under the HomePNA standard. FIG. 19 is a flowchart showing the analog telephone communication monitoring process of the gateway apparatus 60. First, in step S51, the gateway apparatus 60 waits while being ready to detect analog telephone signals. In step S52, it is determined whether the analog telephone signals indicating the communication state have been detected by the CODEC 72. In the case where they have been detected, the procedure goes to step S53. In the case where they are not detected, the procedure goes to step S64.

In step S64, the state of the analog line in the line use status table is changed to "FREE" and the procedure goes back to step S51. In step S53, it is determined whether the analog telephone signals indicating that the line is busy for communications have been detected by the CODEC 72. In the case where they have been detected, the procedure goes to step S65. In the caser where they are not detected, the procedure goes to step S54. In step S65, the state of the analog line in the line use status table is changed to "TALK" and the procedure goes back to step S51. In step S54, it is determined whether the analog telephone signals indicating that a call is being received have been detected by the CODEC 72. In the case where they have been detected, the procedure goes to step S55. In the case where they are not detected, the procedure goes to step S58.

In step S55, the state of the analog line in the line use status table is changed to "RINGING." Then, in step S56, the information for identifying the transmission source such as the caller ID and the telephone number is acquired from the analog telephone signals indicating that a call is being received. In step S57, the acquired information is registered in the line use status table and the procedure goes to step S61.

In step S58, it is determined whether the analog telephone signals indicating that a call is made have been detected by the CODEC 72. In the case where they have been detected, the procedure goes to step S59. In the case where they are not detected, the procedure goes back to step S51. In step S59, the state of the analog line in the line use status table is changed to "CALLING." In step S60, the telephone number to which the call is directed is registered in the line use status table. In step S61, it is determined whether the telephone number of the other party to which the call is directed matches a telephone number registered in the particular/emergency number table. In the case where the telephone number of the other party is registered, the procedure goes to step S62. In the case where the telephone number of the other party is not registered, the procedure goes back to step S51. In step S62, the name of the other party of the communication that has been registered in the particular/emergency number table is registered in the line use status table. In step S63, the priority that has been registered in the particular/emergency number table is registered in the line use status table, and the procedure goes back to step S51.

This embodiment can provide the same effect as those provided by the above-described embodiments. In addition to that, it also can be applied to communication systems under the HomePNA standard.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication system comprising:
    a communication control apparatus connected to a plurality of types of communication lines with different communication methods; and
    a plurality of communication terminal apparatuses that are connected to the communication control apparatus and perform communications with external communication terminal apparatuses via the plurality of types of communication lines,
    wherein the communication control apparatus includes:
    identification information storage means for storing identification information for identifying a communication terminal apparatus of another party that is communicating with the communication terminal apparatus;
    control means for performing control such that when the communication terminal apparatus is about to start particular communications using a communication line of a particular type and another communication terminal apparatus is already performing communications using the communication line of the particular type, then the communications that are currently being performed are disconnected and the particular communications are started; and
    reconnection means for, when the communications are disconnected by the control means, reconnecting the disconnected communications using another communication line that is not being used for communication, based on the identification information stored in the storage means.

2. The communication system of claim 1, wherein the communication control apparatus includes disconnection notification means for transmitting disconnection notification information indicating that the communications will be disconnected to the communication terminal apparatus that is performing the communications to be disconnected, when the communications that are currently being performed are disconnected by the control means, and
    the communication terminal apparatus includes disconnection informing means for receiving the disconnection notification information from the disconnection notification means and informing the user of the contents of the disconnection notification information.

3. The communication system of claim 2, wherein the disconnection notification means transmits the disconnection notification information in the form of speech signals using the communication line.

4. The communication system of claim 1, wherein the communication control apparatus includes particular notification means for transmitting particular notification information indicating that the particular communications will be performed to the other communication terminal apparatuses connected thereto when the communications that are currently being performed are disconnected by the control means, and
    the communication terminal apparatus includes particular informing means for receiving the particular notification information from the particular information means and informing the user of the contents of the particular notification information.

5. The communication system of claim 2, wherein the communication control apparatus includes particular notification means for transmitting particular notification information indicating that the particular communications will be performed to the other communication terminal apparatuses connected thereto when the communications that are currently being performed are disconnected by the control means, and
    the communication terminal apparatus includes particular informing means for receiving the particular notification information from the particular information means and informing the user of the contents of the particular notification information.

6. The communication system of claim 3, wherein the communication control apparatus includes particular notification means for transmitting particular notification information indicating that the particular communications will be performed to the other communication terminal apparatuses connected thereto when the communications that are currently being performed are disconnected by the control means, and
    the communication terminal apparatus includes particular informing means for receiving the particular notification information from the particular information means and informing the user of the contents of the particular notification information.

7. The communication system of claim 1, wherein the communication control apparatus includes predetermined operation storage means for storing an operation table in which a predetermined operation of the communication terminal apparatus, the communication control apparatus performing the predetermined operation and an operation number assigned to each predetermined operation are associated with each other, and
    the communication terminal apparatus includes predetermined information notification means for notifying the control means of a predetermined information related to the operation number,
    wherein when receiving the predetermined information notified from the predetermined information notification means, the control means refers to the operation table and instructs the communication terminal apparatus corresponding to the operation number to perform the predetermined operation.

8. The communication system of claim 2, wherein the communication control apparatus includes predetermined operation storage means for storing an operation table in which a predetermined operation of the communication terminal apparatus, the communication control apparatus performing the predetermined operation and an operation number assigned to each predetermined operation are associated with each other, and the communication terminal apparatus includes predetermined information notification means for notifying the control means of a predetermined information related to the operation number, wherein when receiving the predetermined information notified from the predetermined information notification means, the control means refers to the operation table and instructs the communication terminal apparatus corresponding to the operation number to perform the predetermined operation.

9. The communication system of claim 3, wherein the communication control apparatus includes predetermined operation storage means for storing an operation table in which a predetermined operation of the communication terminal apparatus, the communication control apparatus performing the predetermined operation and an operation number assigned to each predetermined operation are associated with each other, and the communication terminal apparatus includes predetermined information notification means for notifying the control means of a predetermined information related to the operation number, wherein when receiving the predetermined information notified from the predetermined information notification means, the control means refers to the operation table and instructs the communication terminal apparatus corresponding to the operation number to perform the predetermined operation.

10. The communication system of claim 4, wherein the communication control apparatus includes predetermined operation storage means for storing an operation table in which a predetermined operation of the communication terminal apparatus, the communication control apparatus performing the predetermined operation and an operation number assigned to each predetermined operation are associated with each other, and the communication terminal apparatus includes predetermined information notification means for notifying the control means of a predetermined information related to the operation number, wherein when receiving the predetermined information notified from the predetermined information notification means, the control means refers to the operation table and instructs the communication terminal apparatus corresponding to the operation number to perform the predetermined operation.

11. The communication system of claim 5, wherein the communication control apparatus includes predetermined operation storage means for storing an operation table in which a predetermined operation of the communication terminal apparatus, the communication control apparatus performing the predetermined operation and an operation number assigned to each predetermined operation are associated with each other, and the communication terminal apparatus includes predetermined information notification means for notifying the control means of a predetermined information related to the operation number, wherein when receiving the predetermined information notified from the predetermined information notification means, the control means refers to the operation table and instructs the communication terminal apparatus corresponding to the operation number to perform the predetermined operation.

12. The communication system of claim 6, wherein the communication control apparatus includes predetermined operation storage means for storing an operation table in which a predetermined operation of the communication terminal apparatus, the communication control apparatus performing the predetermined operation and an operation number assigned to each predetermined operation are associated with each other, and the communication terminal apparatus includes predetermined information notification means for notifying the control means of a predetermined information related to the operation number, wherein when receiving the predetermined information notified from the predetermined information notification means, the control means refers to the operation table and instructs the communication terminal apparatus corresponding to the operation number to perform the predetermined operation.

13. A communication control apparatus constituting a communication system including the communication control apparatus connected to a plurality of types of communication lines with different communication methods and a plurality of communication terminal apparatuses that are connected to the communication control apparatus and perform communications with external communication terminal apparatuses via the plurality of types of communication lines, the communication control apparatus comprising:

identification information storage means for storing identification information for identifying a communication terminal apparatus of another party that is communicating with the communication terminal apparatus;

control means for performing control such that when the communication terminal apparatus is about to start particular communications using a communication line of a particular type and another communication terminal apparatus is already performing communications using the communication line of the particular type, then the communications that are currently being performed are disconnected and the particular communications are started; and reconnection means for, when the communications are disconnected by the control means, reconnecting the disconnected communications using another communication line that is not being used for communication, based on the identification information stored in the storage means.

14. The communication control apparatus of claim 13, further comprising:

disconnection notification means for, when the communications that are currently being performed are disconnected by the control means, transmitting disconnection notification information indicating that the communications will be disconnected to the communication terminal apparatus that is performing the communications to be disconnected.

15. The communication control apparatus of claim 14, wherein the disconnection notification means transmits the disconnection notification information in the form of speech signals using the communication line.

16. The communication control apparatus of claim 13, further comprising:

particular notification means for, when the communications that are currently being performed are disconnected by the control means, transmitting particular notification information indicating that the particular communications will be performed to the other communication terminal apparatuses connected thereto.

17. The communication control apparatus of claim 14, further comprising:

particular notification means for, when the communications that are currently being performed are disconnected by the control means, transmitting particular notification information indicating that the particular communications will be performed to the other communication terminal apparatuses connected thereto.

18. The communication control apparatus of claim 15, further comprising:

particular notification means for, when the communications that are currently being performed are disconnected by the control means, transmitting particular notification information indicating that the particular communications will be performed to the other communication terminal apparatuses connected thereto.

19. A communication system comprising:

a communication control apparatus connected to a communication line that can perform communications simultaneously using a plurality of types of communication methods; and a plurality of communication terminal apparatuses that are connected to the communication control apparatus and perform communications with external communication terminal apparatuses via the communication line, wherein the communication control apparatus includes:

identification information storage means for storing identification information for identifying a communication terminal apparatus of the other party that is communicating with the communication terminal apparatus;

control means for performing control such that when the communication terminal apparatus is about to start particular communications using a particular communication method and another communication terminal apparatus is already performing communications using the particular communication method, then the communications that are currently being performed are disconnected and the particular communications are started; and reconnection means for, when the communications are disconnected by the control means, reconnecting the disconnected communications using a communication method other than the particular communication method, based on the identification information stored in the storage means.

20. A communication system comprising:

a gateway apparatus connected to an analog communication line and a digital communication line; and a plurality of telephone apparatuses that are connected to the gateway apparatus and perform communications with external telephone apparatuses via the analog and digital communication lines, wherein the gateway apparatus includes:

identification information storage means for storing identification information for identifying a telephone apparatus of the other party that is communicating with the telephone apparatus;

communication control means for controlling such that when the telephone apparatus is about to start particular communications using the analog communication line and another telephone apparatus is already performing communications using the analog communication line, then the communications that are currently being performed are disconnected and the particular communications are started; and reconnection means for, when the communications are disconnected by the communication control means, reconnecting the disconnected communications using the digital communication line, based on the identification information stored in the storage means.

21. The communication system of claim 20, wherein the gateway apparatus and one of the telephone apparatuses are integrated to form one unit.

* * * * *